Dec. 9, 1952  P. ORR ET AL  2,620,908
AUTOMATIC TRANSMISSION
Filed June 18, 1945  10 Sheets-Sheet 2
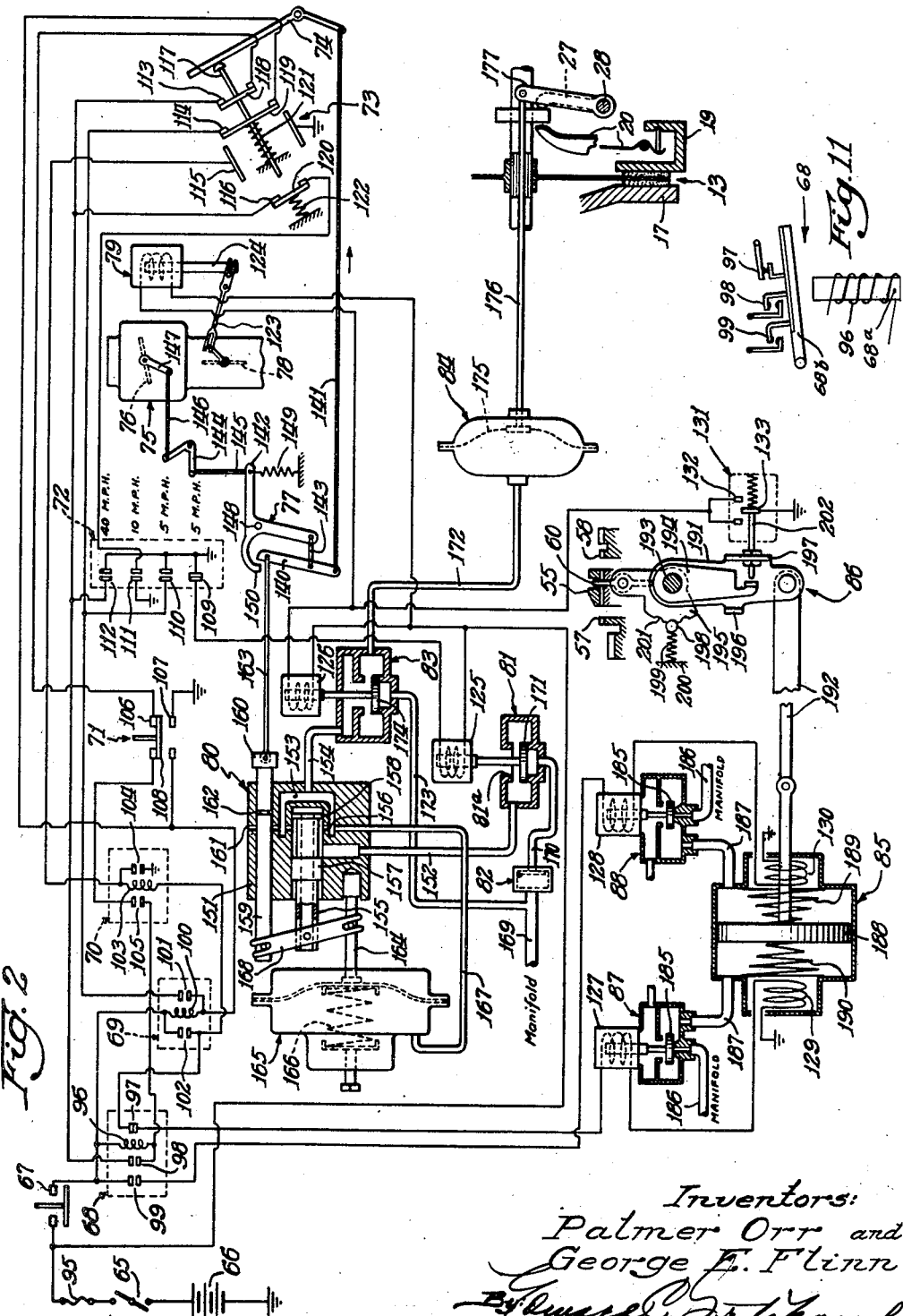
Inventors:
Palmer Orr and
George E. Flinn

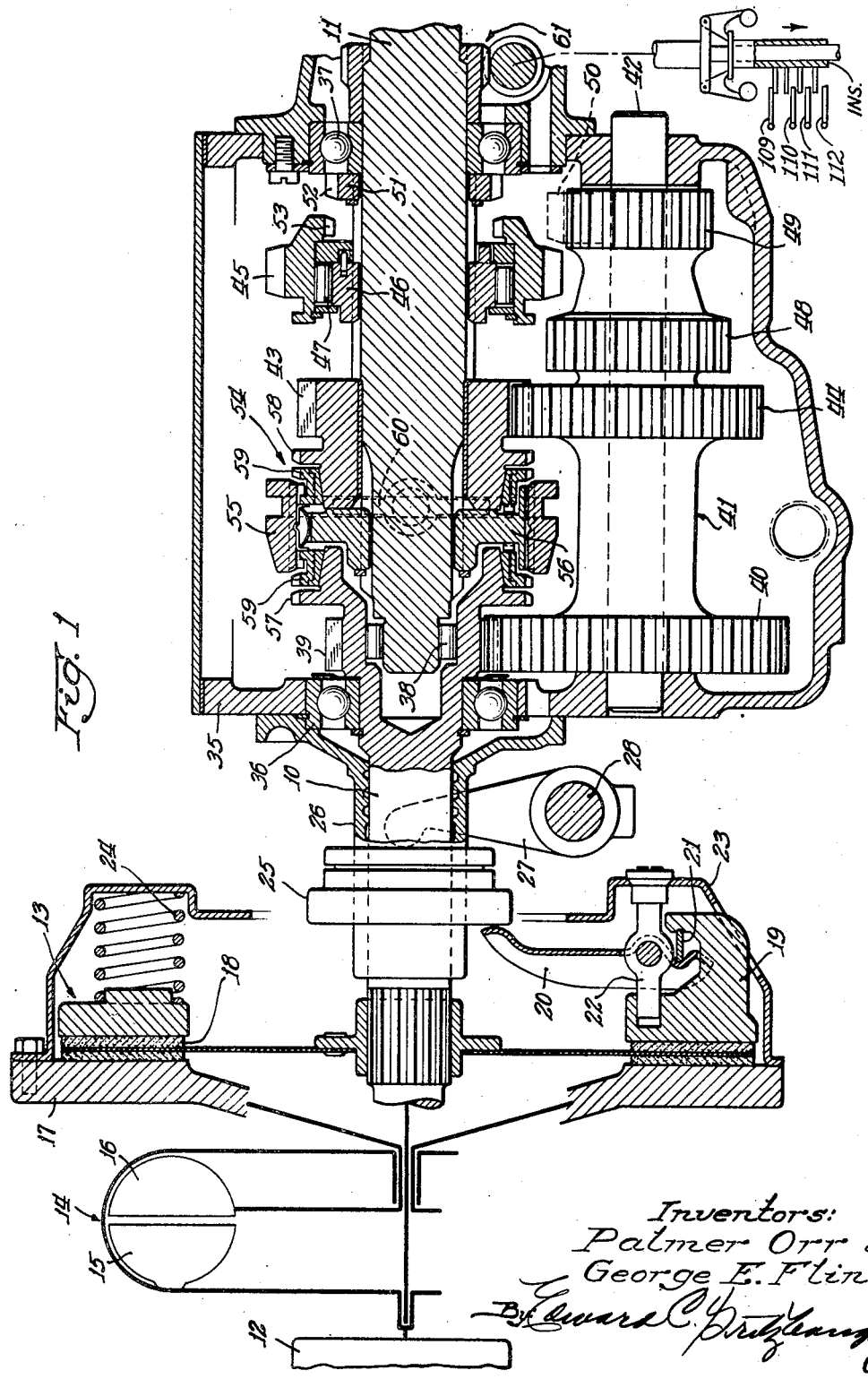

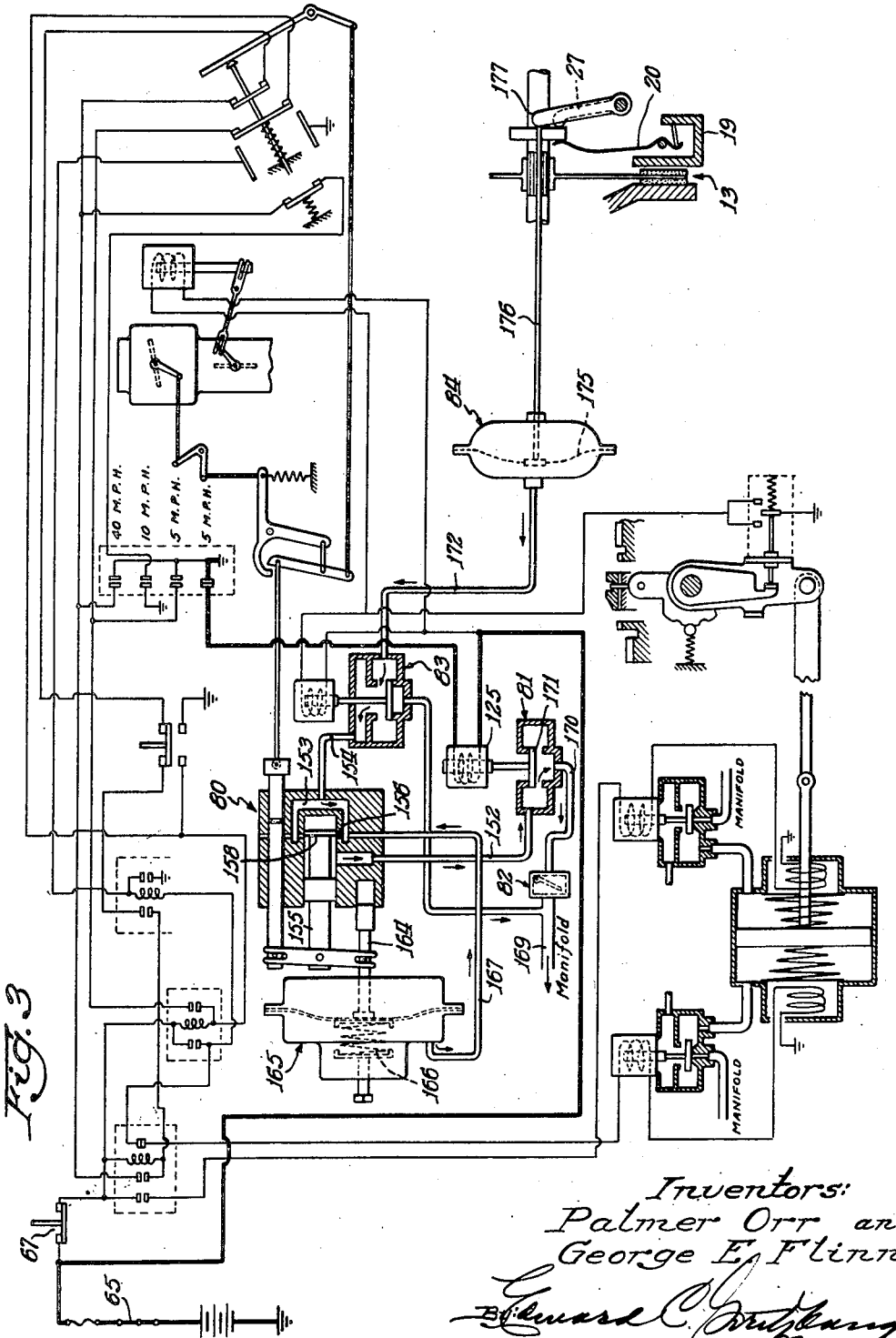

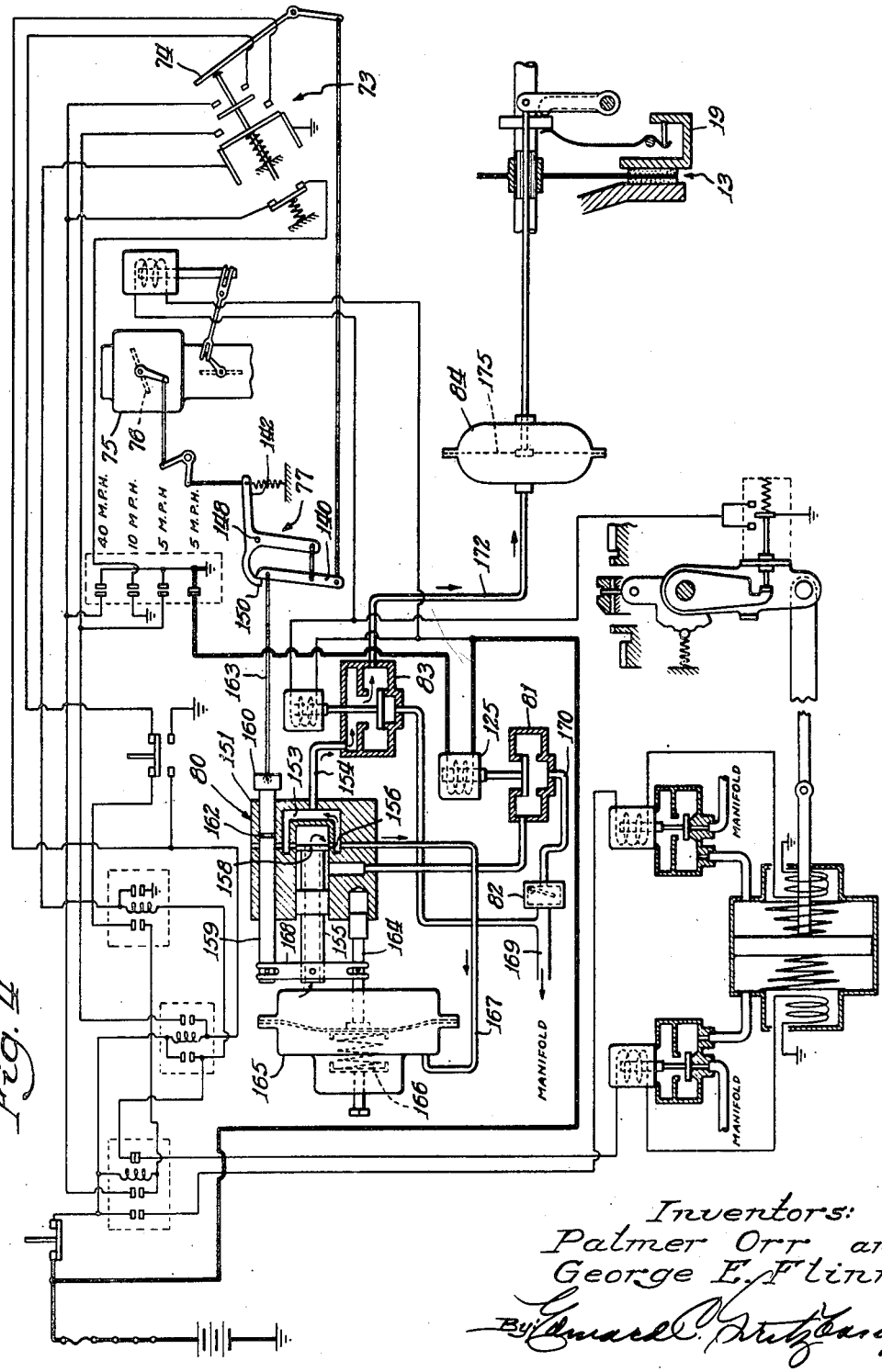

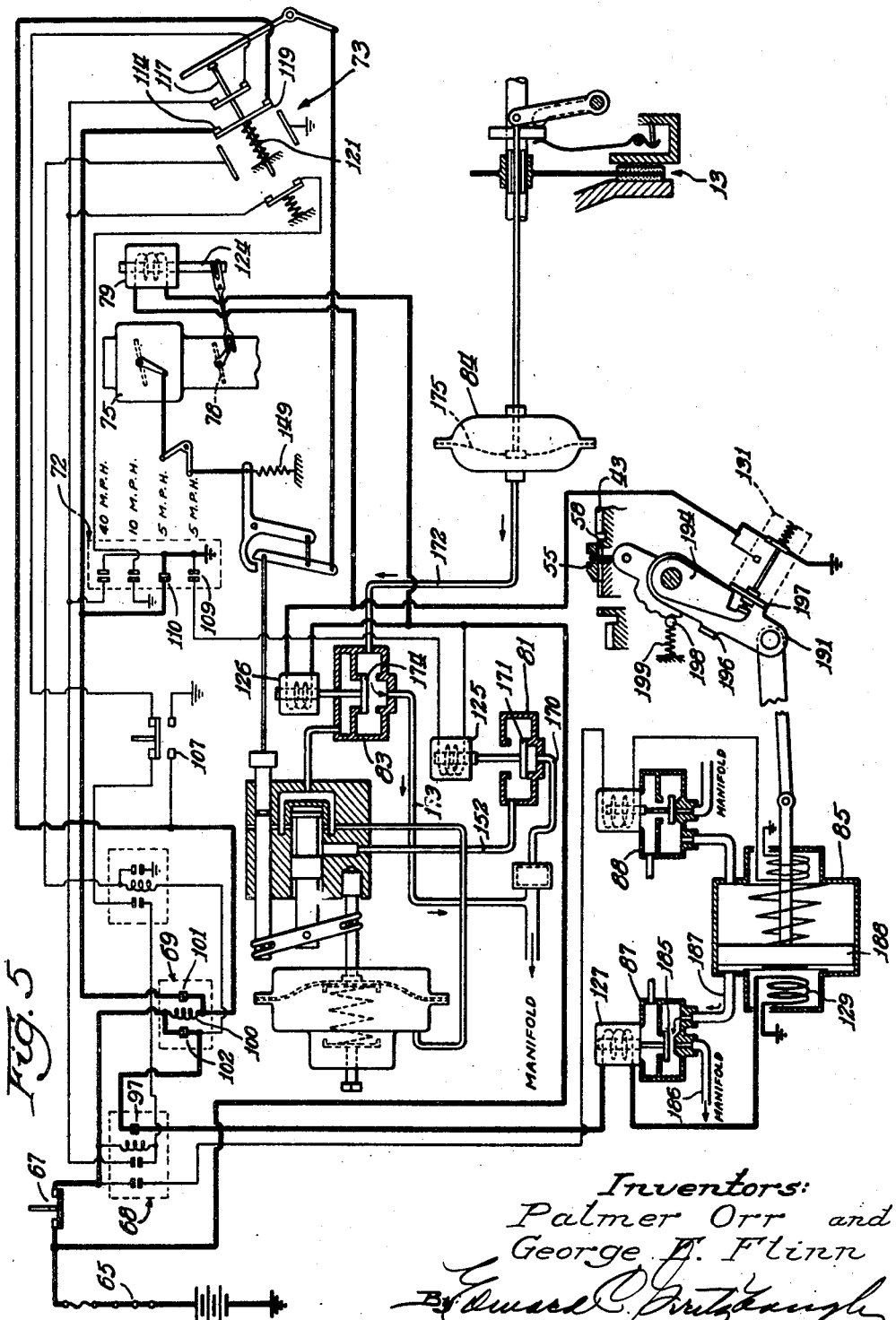

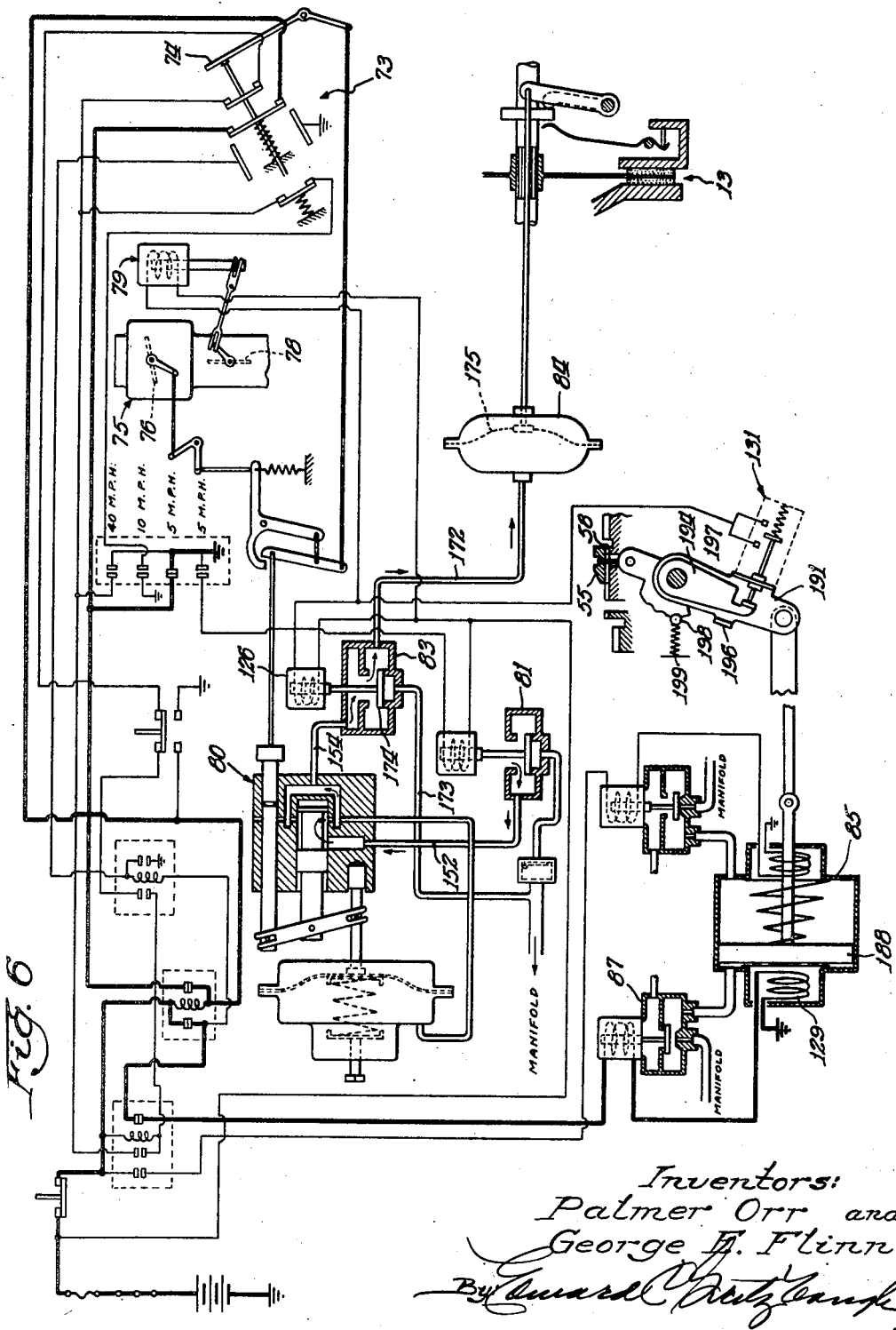

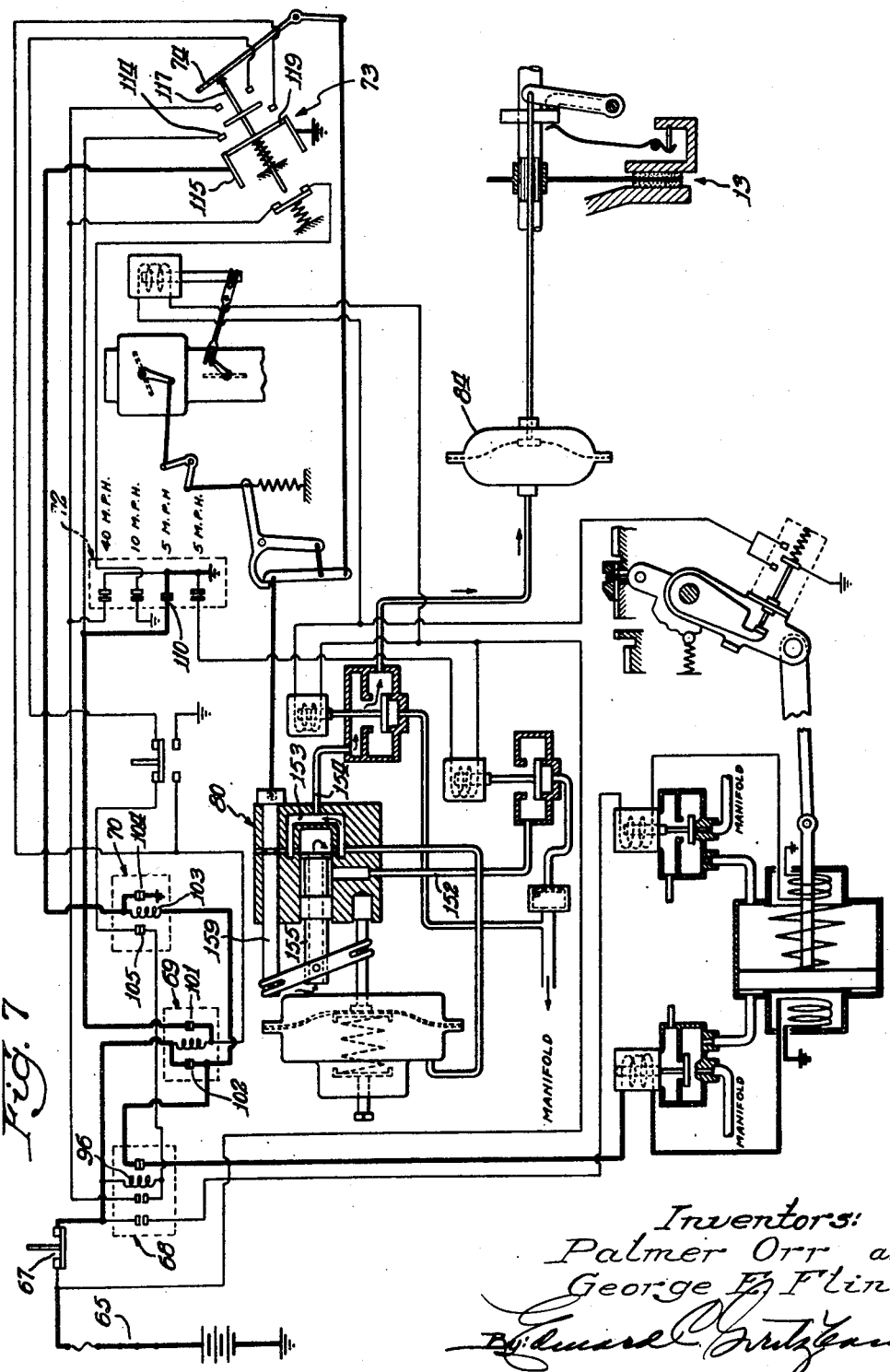

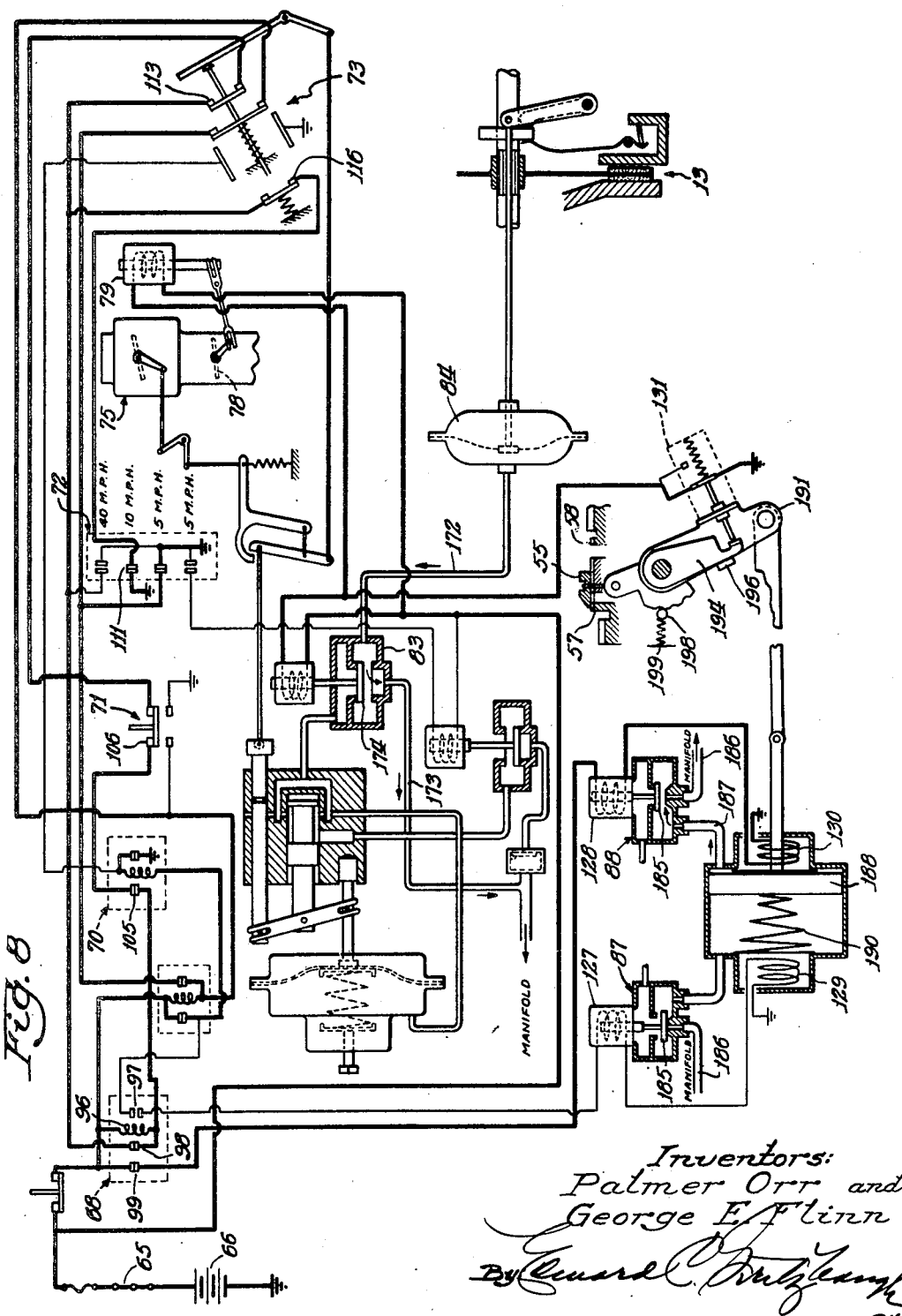

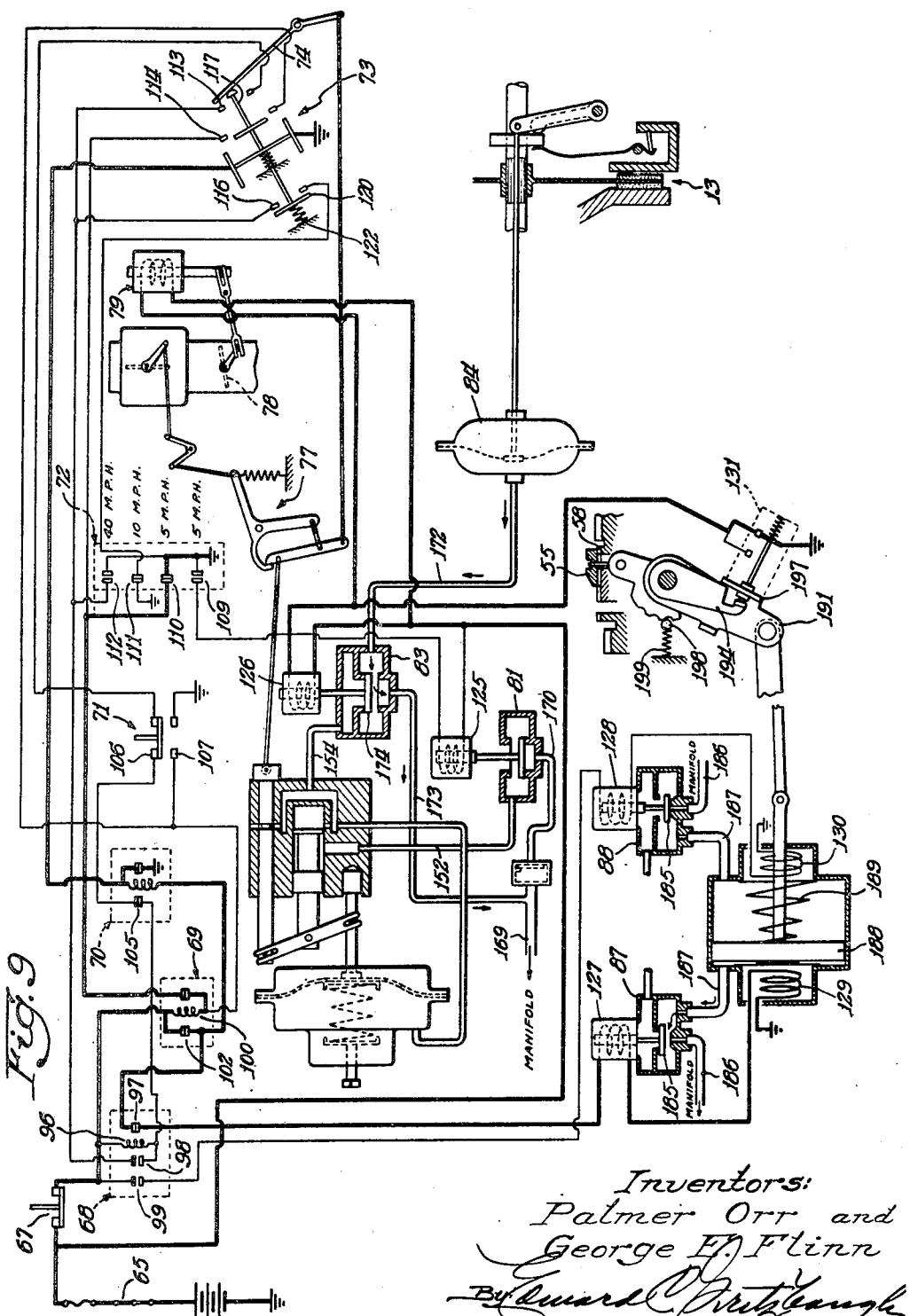

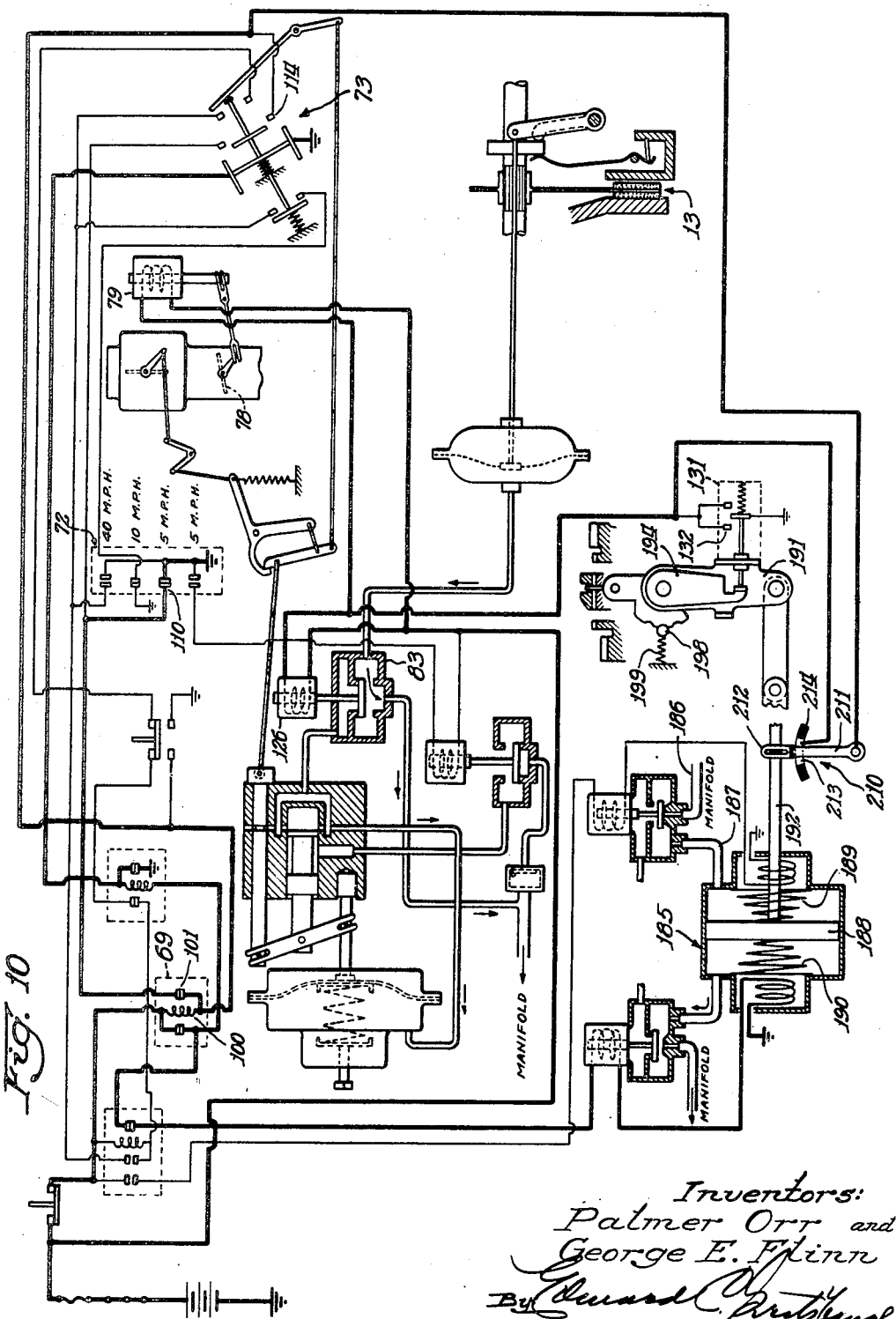

Patented Dec. 9, 1952

2,620,908

UNITED STATES PATENT OFFICE 2,620,908

AUTOMATIC TRANSMISSION

Palmer Orr and George E. Flinn, Muncie, Ind., assignors to Borg-Warner Corporation, Chicago, Ill., a corporation of Illinois Application June 18, 1945, Serial No. 599,994

47 Claims. (Cl. 192—.092)

Our invention relates to transmissions for automotive vehicles and more particularly to control mechanisms for such transmissions.

A well-known type of automotive transmission ordinarily comprises a plurality of gear trains, at least several of which may be completed by means of jaw clutches, and also a primary friction clutch disposed between the drive shaft for the gear trains and an engine for the vehicle. It is an object of our invention to provide mechanism for power shifting a gear train completing jaw clutch in such a transmission and for automatically opening the friction clutch between the engine and transmission while the shift is being made. It is contemplated that the friction clutch shall be opened just prior to a shifting into or out of mesh of the jaw clutch and shall be closed just after the jaw clutch has completed its shifting movement.

For the accomplishment of such objects, it is a further more specific object of our invention to provide a lost motion electric switch connected with a power cylinder, with the arrangement being such that the power cylinder functions to shift a jaw clutch and the switch is put into a changed electrical condition while the power cylinder is operative to make a shift of the jaw clutch. It is contemplated that the electric switch shall be connected with power mechanism for disengaging the primary clutch so that the primary clutch is disengaged while the shift is being made.

It is a further object of our invention to utilize this power mechanism, for shifting a jaw clutch and disengaging a primary clutch, with transmission control mechanism which is under the control of the accelerator for the automotive vehicle so that a shift is made in the transmission by moving the accelerator to one of the limits of its movement. It is accordingly an object of the invention to provide connecting means between the power cylinder for shifting the jaw clutch and the accelerator so that the power cylinder is operative when the accelerator is moved to one of the limits of its movement.

The invention disclosed and claimed in this application is similar in some respects to the inventions disclosed and claimed in the application of John M. Simpson, George E. Flinn, and Carl W. Osborne, Serial No. 599,992, filed June 18, 1945, and the application of George E. Flinn, Serial No. 599,993, filed June 19, 1945.

The invention consists of the novel constructions, arrangements and devices to be hereinafter described and claimed for carrying out the above stated objects and the such other objects as will appear from the following description of certain preferred embodiments illustrated in the accompanying drawings, wherein:

Fig. 1 is a longitudinal sectional view of an automotive transmission connected with a vehicle engine;

Fig. 2 is a diagrammatic illustration of the control mechanism for the transmisison shown in Fig. 1, the ignition switch for the vehicle being open and the accelerator being in closed throttle position;

Fig. 3 is a view similar to Fig. 2 but with the ignition switch being closed and with the vehicle engine being in operation to supply a vacuum;

Fig. 4 is a view similar to Fig. 3 but with the accelerator being partially depressed, the transmission itself having been preliminarily conditioned for low speed forward drive;

Fig. 5 is a view similar to Fig. 4 but with the vehicle travelling above five miles per hour and with the accelerator released to initiate a shift of the transmission from low to second speed ratios;

Fig. 6 is a view similar to Fig. 5 but after a shift from first speed ratio to second speed ratio has taken place, with the accelerator still released;

Fig. 7 is a view similar to Fig. 6 but with the accelerator depressed after the shift from first to second speed ratios has taken place;

Fig. 8 is a view similar to Fig. 7 but with the vehicle travelling above ten miles per hour and with the accelerator released to cause a shift from second speed ratio to high speed ratio;

Fig. 9 is a view similar to Fig. 8 but with the shift to high speed ratio completed and with the accelerator depressed to cause a downshift from third speed ratio to second speed ratio;

Fig. 10 is a diagrammatic illustration of a modified control mechanism for the transmission shown in Fig. 1, with the mechanism being shown with the vehicle speed being above ten miles per hour and with the accelerator being in open throttle or kickdown position; and Fig. 11 is a diagrammatic illustration of one of the relays used in the transmission control mechanisms illustrated in Figs. 2 to 10.

Like characters of reference designate like parts in the several views.

Referring now in particular to Fig. 1 of the drawings, the illustrated transmission is one particularly suitable for use in an automotive vehicle and comprises a drive shaft 10 and a driven shaft 11. The drive shaft 10 is adapted to be driven by means of the engine 12 of the vehicle which is the ordinary internal combustion engine usually used in such vehicles. The shaft 10 is connected with the engine by means of a friction clutch 13 and a hydraulic coupling 14. The hydraulic coupling 14 may be of any suitable well-known construction and comprises an impeller element 15 and a rotor element 16. The element 15 is driven by the motor 12 and fluid in the device 14 functions on such driving of the impeller element to drive the rotor element 16 of the device.

The clutch 13 comprises a driving element 17 and a driven element 18. The driving element is connected with the rotor 16 of the coupling device 14 and the driven clutch element 18 is connected with the drive shaft 10 of the transmission. The driven clutch element 18 is clamped between a pressure plate 19 and the driving element 17 of the clutch. Radially extending clutch levers 20 act on pressure plate 19 by means of struts 21, and these levers are pivotally mounted on studs 22 which are fixed with respect to a clutch cover 23 which rotates with the driving element 17. Springs 24 are disposed between the cover 23 and the pressure plate 19 for yieldingly holding the pressure plate against the driven element 18 for maintaining the clutch engaged. A collar 25 is slidably disposed on a housing portion 26 for the transmission, and this collar is disposed to act against the clutch levers 20 to move the pressure plate 19 rearwardly by means of the struts 21 to disengage the clutch. The collar 25 is acted on by means of a release lever 27 fixed on a shaft 28.

The drive shaft 10 is journaled in the housing 35 for the transmission by means of a roller bearing 36, and the driven shaft 11 is journaled in the housing 35 by means of the roller bearing 37. The shaft 11 is piloted in the shaft 10 by means of rollers 38, as shown. The drive shaft 10 is formed with a spur gear 39, and this gear is in mesh with a gear 40 of a gear cluster 41. A countershaft 42 is provided in the housing 35, and the gear cluster 41 is rotatably disposed on the countershaft. A gear 43 is rotatably disposed on the driven shaft 11 and is in mesh with a gear 44 on the gear cluster 41. Another gear 45 is disposed on the driven shaft 11 and is supported with respect to the shaft by means of a hub 46 splined on the shaft and a one-way roller clutch 47. The roller clutch may be of the ordinary type comprising rollers disposed between opposite cam surfaces, and the clutch is such that it will engage when the gear 45 is driven in the forward direction for thereby driving the shaft 11. The gear cluster 41 also comprises gears 48 and 49 which are adapted to cooperate with the gear 45. The gear 49 is in mesh with an idler gear 50 which is rotatably supported by any suitable means with respect to the housing 35. The gear 45 depending on the position to which it is moved on the shaft 11 may mesh either with the gear 48 or with the idler gear 50. An element 51 having external teeth 52 is splined on the shaft 11, and the gear 45 is provided with internal teeth 53. The teeth 53 are adapted to mesh with the teeth 52 when the gear 45 is moved rearwardly of the transmission to mesh with the idler gear 50 whereby the one-way clutch 47 is rendered ineffective.

A double positive type clutch 54 is provided for connecting either the shaft 10 or the gear 43 with the shaft 11. This clutch comprises an internally toothed collar 55 slidably and non-rotatably disposed on a hub 56 which is splined to shaft 11. The shaft 10 is provided with teeth 57 and the gear 43 is provided with teeth 58 which are adapted to be meshed with the internal teeth of the collar 55 depending on the direction in which the collar is moved. A synchronizer ring 59 of any suitable well-known construction is disposed on each side of the collar 55 on the shaft 10 and on the gear 43 for synchronizing the speed of the collar with either the teeth 57 or the teeth 58 before engagement of the collar with the teeth. A yoke 60 is provided which fits in a groove fromed in the collar 55 for shifting the collar as will be hereinafter described. The transmission is also controlled by means of a governor which will be hereinafter described, and the governor is driven from the driven shaft 11 by means of gearing 61.

The illustrated transmission provides three speed ratios in forward drive and one speed ratio in reverse drive. When the gear 45 is shifted into mesh with the gear 48, the transmission is conditioned for low speed forward drive and the drive is from the shaft 10 through the gears 39 and 40, the gear cluster 41, the gears 48 and 45, the one-way clutch 47 and the hub 46 to the shaft 11. The shaft 10 is driven from the engine 12 through the coupling 14 and clutch 13 as will be understood. Second speed forward drive is provided by shifting the collar 55 to mesh with the teeth 58. The drive is then from the shaft 10 through the gears 39 and 40, the gear cluster 41, the gears 44 and 43, the teeth 58, the collar 55 and the hub 56 to the shaft 11. High or third speed forward is provided by shifting the collar 55 to mesh with the teeth 57. The drive is then from the shaft 10 through the teeth 57, collar 55 and hub 56 to the shaft 11. The gear 45 may be allowed to remain in mesh with the gear 48 for both second and high speeds forward, and the clutch 47 overruns. For reverse drive the gear 45 is shifted into mesh with the idler gear 50, with the collar 55 being in its neutral position in which it is shown in Fig. 1. The drive is then from the shaft 10 through the gears 39 and 40, the gear cluster 41, the gears 49, 50 and 45, the teeth 53 and 52, and the element 51 to the shaft 11. The overrunning clutch 47 would overrun for this direction of drive, and the teeth 53 and 52 and the element 51 are thus necessary for reverse drive.

The mechanism for controlling the transmission shown in Fig. 1 comprises in general (see Fig. 2) an ignition switch 65 connected with the battery 66 of the vehicle, a "forward" conditioning switch 67, a second to high speed ratio conditioning relay 68, a first to second speed ratio conditioning relay 69, a high ratio conditioning relay 70, a coast switch 71, an electric governor 72, an accelerator switch unit 73 actuated by the accelerator 74 of the vehicle, a throttle 75 for the engine 12 and having a butterfly valve 76 connected by linkage 77 with the accelerator 74 and having another butterfly valve 78 actuated by an electric solenoid 79, an accelerator controlled clutch control or engaging valve 80, a vaccum shut-off valve 81, a one-way vacuum valve 82, an electrically controlled vacuum valve 83, a vacuum motor 84 for the clutch 13, a vacuum motor 85 connected with a lever and a switch assembly 86 for shifting the collar 55, an electrically operated vacuum valve 87 for the motor 85 and another electrically operated vacuum valve 88 for the motor 85.

The battery 66 on one terminal is grounded in accordance with standard practice, and the battery has its other terminal connected with the ignition switch 65. A fuse or other overload device 95 is connected in series with the switch 65, and the switch 67 is connected in series with the fuse. The relay 68 comprises a relay winding 96, contacts 97, contacts 98 and contacts 99. As will be noted, the winding 96 and the contacts 99 are connected in series with the switch 67.

The relay 69 comprises a relay winding 100, contacts 101 and contacts 102. One of the contacts 102 and one end of the winding 100 are connected with the switch 67, and the other of the contacts 102 is connected with one of the contacts 97, as shown. The other end of the winding 100 is connected with one of the contacts 101.

The relay 70 comprises a relay winding 103, contacts 104 and other contacts 105. One end of the winding 103 is connected with one of the relay contacts 102 and one of the contacts 105 is connected with an end of the relay winding 96 as shown. One of the contacts 104 is connected with one end of the winding 103 and the other contact is grounded.

The relays 68, 69 and 70 may be of any suitable construction. The relay 68 is shown in some detail in Fig. 11 and comprises a core 68a on which the winding 96 is disposed. A pivotally mounted armature 68b is disposed at one end of the core and carries a contact 97, a contact 98 and a contact 99. The other contacts 97, 98 and 99 are stationary, and the contacts are made and broken with movement of the armature as is apparent. The relays 69 and 70 are similar in construction to the relay 68 with the contacts 101 and 104 and the contacts 102 and 105 corresponding to the contacts 98 and 99, respectively. In the relays 69 and 70 there are no contacts corresponding to the contacts 97.

The coast switch 71 comprises contacts 106 and contacts 107 and a switch arm 108 adapted to bridge either the contacts 106 or 107. One of the contacts 106 is connected with one of the relay contacts 105, as shown. One of the contacts 107 is connected with the relay winding 100, and the other is grounded.

The governor 72 may be of any suitable type and is driven from the driven shaft 11 by the gearing 61, and the governor comprises contacts 109, 110, 111 and 112. When the driven shaft 11 is at rest, the contacts 109 are closed while the other of the governor contacts are open, as shown in Fig. 2. At approximately a speed of the shaft 11 corresponding to five miles per hour speed of the vehicle, the contacts 109 open and the contacts 110 close. At a speed of the shaft corresponding to approximately ten miles per hour, the contacts 111 close, and the contacts 112 close at approximately forty miles per hour speed of the vehicle. It will be understood that the contacts 110 remain closed at all speeds above five miles per hour, the contacts 111 remain closed at all speeds above ten miles per hour and the contacts 112 remain closed at all speeds above forty miles per hour. One of each of the sets of contacts 109, 110, 111 and 112 is grounded as shown. The other of the contacts 110 is connected with one of the contacts 101, and the other of the contacts 112 is connected with one of the contacts 98 as shown.

The accelerator switch 73 comprises contacts 113, contacts 114, contacts 115 and contacts 116, an accelerator plunger 117, and switch arms 118, 119 and 120. A spring 121 is provided between the arm 119 and a stationary part for yieldingly holding the plunger 117 and accelerator 74 in the closed throttle positions of these parts in which they are shown in Fig. 2. A spring 122 is provided for yieldingly holding the switch arm 120 in its position bridging the contacts 116. One of the contacts 113 is connected with a contact 116 and also with one of the contacts 112 of the governor. The other contact 113 is connected with one of the contacts 106 of the coast switch 71. One of the contacts 114 is connected with one of the contacts 110 of the governor, and the other of the contacts 114 is connected with one of the contacts 107 of the coast switch. One of the contacts 115 is connected with the winding 103 of the relay 70, and the other contact 115 is grounded. One of the contacts 116 is connected with one of the contacts 13 as described above, and the other contact 116 is connected with one of the governor contacts 111.

The butterfly valve 78 in the throttle 75 of the engine 12 is connected by means of a forked lever 123 with the armature 124 of the solenoid 79. The solenoid 79 when energized functions to turn the lever and thereby move the valve 78 whereby to substantially close the throttle 75 and allow the engine 12 to operate only at idling speed. One end of the solenoid is connected with the battery 66 through the switch 65 and fuse 95 as shown.

The valve 81 comprises an electric solenoid 125 for operating the valve, and this solenoid has one end connected to the battery through the fuse and the ignition switch and its other end is connected with one of the governor contacts 109. The electrically operated valve 83 comprises a solenoid 126, and one end of this solenoid also is connected with the battery through the fuse and ignition switch.

The electrically operated valve 87 comprises a solenoid 127 which has one end connected with one of the contacts 97 of the relay 68. The valve 88 comprises an electric solenoid 128, and one end of this solenoid is connected with one of the contacts 99 of the relay 68.

The suction motor 85 comprises two holding coils 129 and 130. One end of each of the holding coils is grounded as shown, and the end of the coil 129 is connected with one end of the solenoid 127 and the other end of the coil 130 is connected with one end of the solenoid 128, as shown.

The lever and switch assembly 86 comprises the switch 131 having contacts 132 and a switch arm 133. The two contacts are connected with one end of the throttle closing solenoid 79 and also with one end of the solenoid 126 of the valve 83. The switch arm 133 is grounded as shown.

The linkage mechanism 77 coupling the accelerator pedal 74 and the butterfly valve 76 of the throttle 75 together comprises a lever 140 connected by means of a link 141 with the pedal 74, another lever 142 connected by means of a link 143 with the lever 140, a bell crank lever 144 connected by a link 145 with the lever 142 and by a link 146 with a lever 147 which is connected with the valve 76. The lever 142 is pivoted at 148 and has a spring 149 acting on its end connected with the link 145. The lever 142 is formed with a portion 150 which is adapted to cooperate with the lever 140 as will be hereinafter described.

When the accelerator 74 is depressed, that is, when it is moved in a counterclockwise direction as seen in Fig. 2, the link 141 is moved to the right as seen in this figure and as indicated by the arrow, and the lever 140 is moved in a counterclockwise direction about its connection with the link 143 until it contacts the portion 150 of the lever 142. A clearance ordinarily exists between the upper end of the lever 140 and the part 150 of the lever 142 before the accelerator has been depressed for purposes which will hereinafter be described. After the lever 140 has contacted the portion 150, both the levers 140 and 142 thereafter move together about the pivot 148 in a counterclockwise direction against the action of the spring 149, and the movement of the lever 142 through the links 145 and 146 and the bell crank lever 144 moves the butterfly valve 76 to open the throttle 75. The butterfly valve 76 is the ordinary throttle opening valve ordinarily found in the throttle of an internal combustion engine, and it is opened by a depressing of the associated accelerator as in ordinary installations.

The clutch engaging valve 80 is actuated by the accelerator 74 and the accelerator linkage 77. The valve comprises a valve block 151 having a passage therein which forms a part of a vacuum conduit 152, and the block is provided with a chamber 153 therein which is connected with a conduit 154. A valve piston 155 is disposed in a cylindrical cavity in the valve block 151, and this cavity is connected by means of openings 156 with the chamber 153. The piston 155 is provided with lands 157 and 158 fitting in the cavity for the piston, and the piston is hollow as shown. A plunger 159 extends through the valve body 151, and the plunger is provided with a stop 160 on an end thereof for limiting its movement. A passage 161 is provided in the valve body, and the plunger 159 is provided with a groove 162 which completes the passage from the chamber 153 to the atmosphere when the plunger 159 is positioned with its stop 160 against the valve block 151. The plunger 159 is connected by means of a link 163 with the lever 140, as shown, and the plunger is actuated by means of the mechanism 77 as will be described.

A plunger 164 is slidably disposed in a suitable cavity in the valve casing 150, and the plunger is connected with a vacuum diaphragm motor 165 which functions to move the plunger according to the amount of vacuum effective on the diaphragm. The motor 165 comprises a spring 166 effective on the diaphragm and the motor is connected by means of a conduit 167 with the chamber 153 in the valve block 151. The plunger 159, the valve piston 155, and the plunger 164 are connected together by means of a floating lever 168. The connection of the lever 168 with the piston 155 is a simple pivotal connection while the connections of the lever 168 with the plungers 159 and 164 are pin and slot connections as shown.

The conduit 152 is connected to a vacuum conduit 169 by means of the valves 81 and 82 and a conduit 170. The conduit 169 is connected with the manifold of the engine 12 or any other suitable source of vacuum. The valve 82 is a one-way valve of any suitable construction which allows vacuum to be introduced into the conduit 170 but does not allow atmospheric pressure to enter the conduit 170 if the vacuum in the conduit 169 momentarily decreases, such as to atmospheric pressure. The valve 81 is a two position valve comprising a valve piston 171 which is actuated by the solenoid 125. The valve 81 has an atmospheric port 81a in its casing through which air may pass as will be described. When the solenoid 125 is deenergized, in which condition it is shown in Fig. 2, the piston 171 blocks the conduit 170 and permits atmospheric pressure to enter the conduit 152 through the port 81a. When the solenoid 125 is energized, the piston 171 is drawn upwardly to close the port 81a to the atmosphere and to connect the conduits 170 and 152 for thereby causing vacuum to be applied to the valve 80.

The chamber 153 in the valve body 151 is connected to the valve 83 by means of the conduit 154. The valve 83 is also connected with the vacuum motor 84 by means of a conduit 172, and the valve is connected with the vacuum conduit 169 by means of a conduit 173. The valve 83 is a two-position valve and comprises a valve piston 174 acted on by the solenoid 126. When the solenoid 126 is deenergized, the valve piston 174 is in its position as shown in Fig. 2. In this position the valve piston blocks the conduit 173, and the valve connects the conduits 154 and 172. When the solenoid 126 is energized, the valve piston 174 is raised so as to block the conduit 154 and to connect the conduits 173 and 172. The vacuum motor 84 comprises a diaphragm 175 which is connected by means of a link 176 with a lever 177 that is fixed to the rock shaft 28 for the clutch actuating lever 27.

The valve 80 functions to cause engagement of the clutch 13 in accordance with the wishes of the driver of the vehicle as expressed through the accelerator 74, that is, the rate of engagement of the clutch 13 is under the control of the accelerator 74. The vacuum motor 84 in its condition as shown in Fig. 2 has no vacuum applied to it, and the clutch 13 is engaged. If vacuum is applied to the motor 84 through the conduit 172, the diaphragm 175 of the motor operates by means of the link 176, the levers 177, 27 and 20 and the collar 25 to disengage the clutch 13 against the action of the clutch springs 24. If the solenoid 126 of the valve 83 is energized, the valve piston 174 is raised and vacuum is applied to the motor 84 through the conduits 173 and 172 for disengaging the clutch. If the solenoid 126 of the valve 83 is deenergized to block the conduit 173, the vacuum for disengaging the clutch 13 must come through the conduits 152 and 154. When the solenoid 125 of the valve 81 is energized, the valve 81 functions to connect the conduit 152 to the conduit 169 by means of the conduit 170, and the valve 80 may function to connect the motor 84 with the conduit 152, when the accelerator is depressed as will be described, through the conduits 154 and 172.

The valve 80 functions to engage the clutch 13 according to the depression of the accelerator 74 when the valve 81 connects the conduits 170 and 152 and when the valve 83 connects the conduits 154 and 172. When the accelerator is depressed, the lever 140 is rotated counterclockwise, as has been described, and this movement is transmitted through the link 163 to the plunger 159. The plunger 159 moves to the left as seen in Fig. 2 and moves the valve piston 155 also in this direction. Movement of the piston 155 in this direction functions to connect the conduit 154 through the chamber 153, the passages 156 and the internal opening of the piston with the atmospere to relieve the vacuum on the motor 84 to engage the clutch. The motor 165 acting through the floating lever 168 acts to move the piston 155 back to the right as the vacuum is relieved on the two vacuum motors which are connected through the chamber 153 in causing an engagement of the clutch 13, and a small movement of the plunger 159 to the left as seen in the figure thus causes only a small engagement of the clutch 13 due to the action of the motor 165, all as will be more fully described below. The clutch 13 is fully engaged when the plunger 159 is moved sufficiently so that its stop 160 contacts the valve block 151, and continued movement of the accelerator 74 thereafter toward its fully open throttle position causes movement of the levers 140 and 142 about the connection of the lever 140 with the link 163 and the lever 140 about the pivot 148 to further open the butterfly valve 76.

The vacuum motor 85 is controlled by means of the valves 87 and 88. The valve 87 comprises a valve piston 185 actuated by the solenoid 127. The valve is connected with a source of vacuum by means of a conduit 186 and with the motor 85 by means of a conduit 187. In the deenergized condition of the solenoid 127, the valve piston 185 is in its position as shown and blocks the conduit 186. When the solenoid 127 is energized, the valve piston 185 is raised and functions to connect the conduits 186 and 187 for applying vacuum to the motor 85. The valve 88 is similar in construction to the valve 87, and the similarly numbered parts function in the same manner as those in the valve 87; the valve 88 is, however, connected to the opposite side of the motor 85 and functions to energize the motor in the opposite direction.

The motor 85 comprises a piston 188 which is acted upon by a pair of springs 189 and 190. The springs function to yieldingly maintain the piston in its neutral position as will be understood. The piston is also acted on by the holding coils 129 and 130 when the piston is in either of its extreme positions, and these coils function to augment the force of the vacuum acting on the piston and applied through one of the valves 87 and 88. The piston is connected to a shift lever 191, comprising a part of the lever and switch assembly 86, by means of a rod 192. The lever 191 is swingably disposed on a shaft 193 which is rotatably disposed in the transmission housing 35 in any suitable manner (not shown). A shift element 194 is fixed to the shaft 193, and the shaft 193 has fixed thereto on its inner end an element 195 carrying the fork 60 which is disposed in the groove provided in the collar 55. The arrangement is such that when the shift element 194 is moved, the element 195 and the yoke 60 and collar 55 are given a corresponding movement.

The shift lever 191 and the shift element 194 have a lost-motion connection between them. This connection is provided by two lugs 196 and 197 disposed on opposite edges of the shift lever 191. When the shift lever 191 is moved by the motor 85, the shift lever does not function to move the shift element until one of the lugs 196 and 197 contacts the shift element. The motor 85 is adapted to shift the shift element 194 and the collar 55 only a portion of the distance required for the meshing of the internal teth of the collar 55 with the teeth 57 and 58, and the element 195 and the collar 55 are moved the remainder of the distance required for full engagement by ball and detent means. The ball and detent means comprises a ball 198 and a spring 199 disposed between a stationary part 200 of the transmission housing 35 and the ball. Grooves 201 are provided in the shift element 195, and the ball 198 coacting with the grooves functions to move the shift element 195 and collar 55 into fully engaged positions after the motor 85 has functioned to move the shift element 195 into position so that the ball and detent means may become effective.

The switch 131 comprises a plunger 202 carrying the switch arm 133. The plunger extends through the lug 197 and is reciprocable with respect to the lug 197 and the plunger is acted on by the shift element 194. The switch is so arranged that when the shift lever 191 is acted on by the motor 85 so as to take up the lost motion between the shift element 194 and the shift lever 191, the switch arm 133 is moved to contact either of the switch contacts 132 so as to close the switch 131.

*Operation*

*Vehicle at rest, with ignition switch open.*—In this condition of the vehicle, the parts of the transmission and its operating mechanism are as shown in Figs. 1 and 2. The transmission is in neutral condition, and the gear 45 is in its out-of-mesh position, in which it is shown in Fig. 1. The ignition switch 65 is open and none of the electrical parts of the controlling mechanism are energized. The engine 12 is inoperative, and there is no vacuum in the conduit 169. The conduit 169 is furthermore closed with respect to the rest of the vacuum system by the valves 81 and 83, the solenoids 125 and 126 being deenergized. No vacuum is therefore exerted on the motor 84, and the clutch 13 is engaged due to the action of the clutch springs 24. The two springs 189 and 190 hold the piston 188 of the vacuum motor 85 in neutral position, and the shift collar 55 is in its neutral position.

*Transmission conditioned for low speed forward, accelerator in closed throttle position.*—This condition of the operating mechanism for the transmission is shown in Fig. 3. In this figure, as in the following figures, various of the parts of the transmission operating mechanism are shown in positions differing from their positions shown in Fig. 2, as is apparent. In Fig. 3 and in the following figures the flow of current through the various electric leads is indicated by showing these leads in heavy lines and the exhausting of the various conduits as well as the subsequent admission of air therein is indicated by appropriate arrows shown in the conduits indicating the direction of the flow of air therein.

In order to condition the transmission itself for forward movement, the gear 45 is shifted to the left as seen in Fig. 1 to bring it into mesh with the gear 48. The ignition switch 65 is closed, and the forward direction switch 67 is also closed. The engine 12 is started and is running in idling condition, and a vacuum is thus present in the conduit 169. Due to the closing of the ignition switch 65, the solenoid 125 of the valve 81 is energized to move the piston 171 of the valve upwardly to close the conduit 152 to the atmosphere and connect it with the conduit 170. A vacuum is thereby caused to exist in the conduits 170 and 152, in the valve 80, its chamber 153, the conduit 154, the valve 83 and in the conduit 172 so that vacuum is exerted on the diaphragm 175 of the vacuum motor 84. The diaphragm 175 is thereby moved and is effective through the link 176, the levers 177 and 27 and the clutch levers 20 to pull the pressure plate 19 of the clutch 13 rearwardly to disengage the clutch. The valve 80 is conditioned for operation by movement of the diaphragm of the motor 165 against the spring 166 due to the vacuum being exerted on the diaphragm through the conduit 167. This movement of the diaphragm of the motor 165 through the plunger 164 functions to move the valve piston 155 to the left as seen in the figure to substantially align its land 158 with the openings 156 in the valve 80. The two diaphragms 175 and that of the motor 165 and the springs acting on these diaphragms are so adjusted with respect to each other that the valve piston 155 functions to substantially block the openings 156 when the clutch 13 is in fully disengaged condition.

*Accelerator depressed for starting the vehicle.*—This condition of the operating mechanism of the transmission is shown in Fig. 4. The vehicle is started by depressing the accelerator 74. The depression of the accelerator functions through the linkage mechanism 77 to open the butterfly valve 76 of the throttle 75 for increasing the speed of the engine 12. Such movement of the levers 140 and 142 of the linkage 77 has the additional function of causing movement of the plunger 159 to the left as seen in the figure through the link 163, and for the present it is assumed that the accelerator has been depressed only enough to give the plunger a small movement. This movement of the plunger causes a small movement of the valve piston 155 in the same direction. This movement of the valve piston operates to connect the motor 84 through the conduit 172, the valve 83, the conduit 154, the chamber 153, the passages 156, and through the internal opening in the valve piston 155 with the atmosphere for allowing a movement of the diaphragm 175 of the motor 84 toward the right as seen in the figure with a resultant engaging movement of the clutch pressure plate 19. This decrease in vacuum in these conduits and in the chamber 153 causes a corresponding decrease in vacuum applied to the diaphragm of the motor 165 through the conduit 167 connected with the chamber 153. The diaphragm of the motor 165 thus has a small movement to the right as seen in the figure which is caused by the spring 166 to thereby cause a small movement of the valve piston 155 in this direction. This movement of the valve piston 155 again brings the land 158 of the piston over the passages 156 to prevent a further decrease in the vacuum in the conduits 154, 172, and 167, and the clutch 13 remains in partially engaged condition. It will be understood that the clutch controlling valve 155 is controlled jointly by the plunger 159 and the plunger 164 through the agency of the floating lever 168, and this movement of the plunger 159 in one direction and of the plunger 164 in the other direction results in the return of the valve 155 to its initial position blocking the passages 156.

Further small movement of the plunger 159 to the left as seen in the figure by means of the accelerator 74 thus causes a corresponding small movement of the pressure plate 19 of the clutch 13 toward fully engaged position, and it will be apparent that the clutch 13 can be engaged as quickly as possible or in as many small different steps as desired simply by accordingly moving the accelerator 74 toward open throttle position. This movement of the accelerator, it will be understood, causes corresponding movements of the butterfly valve 76, and it will be apparent that an increasing amount of fuel is fed to the engine 12 by means of the accelerator at the same time as the clutch 13 is brought toward fully engaged condition.

The lost motion between the link 140 and the portion 150 of the lever 142 is provided so that the clutch 13 is slightly engaged before the butterfly valve 76 is moved from its engine idling position. This prevents the engine from being brought to a destructive or harmful speed before there is any engagement of the clutch. This slight engagement of the clutch is due to the fact that the plunger 159 is given a small movement before the valve 76 is moved by means of its linkage. The groove 162 is provided in the plunger for providing a direct connection with atmosphere from the chamber 153 when the plunger is moved to the limit of its movement with the stop 160 contacting the valve block 151. A release of vacuum on the vacuum motor 84 is thereby made quicker, as when the accelerator is moved quickly to fully opened position, inasmuch as the air in this case entering the chamber 153 and associated conduits need not all flow through the small passages 156.

When the plunger 159 is moved to the limit of its movement with its stop 160 contacting the valve block 151, the clutch 13 is fully engaged. The stop 160 makes such contact when the accelerator is approximately in its half open throttle position. Thereafter the lever 140 pivots about its connection with the link 163 and the lever 142 pivots about its pivot point 148, and the linkage 77 on further depression of the accelerator functions to further open the butterfly valve 76 to further increase the speed of the engine 12.

As is apparent from an inspection of the construction, the greater the decrease in vacuum in the conduits 154 and 172, the greater is the engagement of the clutch 13. In starting the vehicle, particularly in cold weather, it frequently happens that the motor begins to stall. Under such conditions, the vacuum in the manifold of the engine decreases, and there would be resulting decrease in the vacuum in the conduit 169 and thereby in the conduits connected therewith. Such stalling of the engine would thus cause a further engagement of the clutch 13 and would increase the load on the engine whereby the engine would be certain to completely stall. The one-way valve 82 is provided for preventing this increase in engagement of the clutch 13 when the engine starts to stall. When there is such a decrease in vacuum in the conduit 169 due to stalling of the engine, the valve 82 closes and maintains the vacuum in the conduit 170 and the conduits connected therewith at the same high value as before the stalling to maintain the clutch 13 in the same condition of disengagement as previously. When the engine again begins to operate normally, the valve 82 reopens in response to the increase of vacuum in the conduit 169, and the operation of the clutch 13 under the control of the valve 80 proceeds as has been described.

When he clutch 13 has been thus engaged, the driven shaft 11 is driven in low speed ratio, the gear train of which has previously been described. Since the gear train includes the one-way clutch 47, this low speed drive is a free-wheeling drive.

*Vehicle traveling above five miles per hour, accelerator released to open throttle position to upshift transmission to second speed.*—This condition is shown in Fig. 5 of the drawings. An upshift from first speed to second speed ratio is obtained by releasing the accelerator 74 and allowing it to return to its closed throttle position under the action of the springs 121 and 149, after the speed of the vehicle has reached five miles per hour. At five miles per hour speed of the vehicle, the governor contacts 110 close and the governor contacts 109 open, as has been described. Such opening of the contacts 109 breaks the electric circuit through the solenoid 125 for the valve 81, and the valve piston 171 returns to its position blocking the conduit 170 and opening the conduit 152 to atmosphere. After such movement of the valve piston 171, the clutch 13 cannot thereafter be disengaged due to the action of the accelerator 74.

When the accelerator returns to its closed throttle position, the contacts 114 are closed by the switch arm 119 carried by the accelerator plunger 117. An electric circuit is thus completed from the battery 66 through the switches 65 and 67, the winding 100 of the relay 69, the contacts 114 of the accelerator switch 73 and the contacts 110 of the governor 72 to ground. The relay 69 is thus energized and its contacts 101 are closed and complete a circuit from the lower end of the winding 100 to the governor contacts 110 and from thence to ground, this circuit being in parallel with that through the contacts 114 of the accelerator switch 73. Thus after the contacts 114 are once closed by movement of the accelerator 74, the relay 69 remains energized regardless of the subsequent depression of the accelerator. The contacts 102 of the relay 69 are closed when the relay is energized and they complete a circuit from the battery through the switches 65 and 67, the contacts 102, the contacts 97 of the relay 68, the solenoid 127 and the holding coil 129 to ground. The solenoid 127 is thus energized to control the valve 87.

Upon the solenoid 127 being thus energized, its valve piston 185 is moved upwardly to effectively connect the associated conduits 186 and 187 and apply vacuum to the left side of the piston 188. The valve 88 remains in its original condition and the other side of the piston is effectively connected with the atmosphere. Such application of vacuum on the piston 188 causes the piston to move toward the left as seen in the figure and to thereby pull the shift lever 191 in a clockwise direction. The lug 197 of the shift lever makes contact with the shift element 194 and exerts a pressure on the shift element tending to move the shift element 194 and the collar 55 to engage the collar with the teeth 58 of the gear 43. During the initial movement of the shift lever 191 in a clockwise direction, it moves relative to the collar 55 and shift element 194 until the lug 197 strikes the shift element 194. When the lug 197 strikes the shift element 194 the switch 131 is closed, and remains closed until the ball 198 functions to shift the collar 55 into its completely engaged position.

The switch 131 functions, during closure thereof when such a force is exerted on the shift lever 191 to cause a disengagement of the clutch 13 and an incidental closing of the throttle 75 by means of the butterfly valve 78. As has been described, the switch 131 is closed when the shift lever 191 is so acted on by the motor 85 to tend to cause a shift of the collar 55. The switch 131 completes a circuit through the solenoid 126 for the valve 83 from the ignition switch 65, and the switch 131 also completes a circuit from the ignition switch through the solenoid 79 for the butterfly valve 78. The energization of the solenoid 126 causes the valve piston 174 of the valve 83 to move upwardly and connect the conduits 173 and 172. Vacuum is thus exerted on the diaphragm 175 of the motor 84 through the conduits 173 and 172 to disengage the clutch 13. Energization of the solenoid 79 acts on the armature 124 of the solenoid 79 and rotates the butterfly valve 78 to engine idling position, and the valve 78 remains in this condition as long as the switch 131 is closed. While the motor 84 by means of the switch 131 thus functions to disengage the clutch 13 and bring the speed of the engine 12 to idling condition, the motor 85 functions to move the collar 55 into engaged condition with the teeth 58 of the gear 43, with a synchronizer 59 functioning to synchronize the speed of the collar 55 and the gear 43 before a full engagement of the collar with the teeth. The disengagement of the clutch 13 allows an easy engagement of the collar with the teeth and an easy functioning of the synchronizer, and the action of the butterfly valve 78 is such that the engine 12 cannot be increased to harmful speed while the clutch is disengaged regardless of the fact that the accelerator 74 may be depressed after the shift has once been initiated.

*Vehicle speed above five miles per hour, upshift to second speed ratio completed, accelerator still released.*—This condition of the control mechanism is shown in Fig. 6. As has been described, the motor 85 is effective for shifting the collar 55 through the greater part of its shifting movement, and the ball and poppet means comprising the spring 199 and the ball 198 is effective to complete the shift. When the ball and poppet means functions in this manner, the shift lever 191 and the shift element 194 move back to their original relative positions in which the lugs 196 and 197 are out of contact with the shift element 194. When the shift lever and the element have such relative movement, the switch 131 opens, inasmuch as the condition of the switch 131 is dependent upon the relative positions of the shift lever and the shift element. Such opening of the switch 131 opens the circuit through the solenoid 79 for the butterfly valve 78 in the throttle 75 and also the circuit for the solenoid 126 for the valve 83. The butterfly valve 78 returns to its throttle opening position and the amount of fuel thereafter flowing through the throttle 75 to the engine is dependent only on the position of the butterfly valve 76 closed mechanically from the accelerator 74. When the solenoid 126 of the valve 83 is deenergized, the valve piston 174 returns to its position blocking the conduit 173 and connecting the conduit 154 with the conduit 172. Vacuum is thus released on the diaphragm 175 of the vacuum motor 84 and air flows through the valve 81, the conduit 152, the valve 80, the conduit 154, the valve 83 and the conduit 172, as is indicated by the arrows in the figure. The diaphragm thus moves to the right as seen in the figure and the clutch 13 is again engaged under the action of the clutch springs 24.

With the clutch 13 being engaged and the collar 55 being moved into engagement with the teeth 58, the transmission is in second speed ratio. The gear 45 remains engaged with the gear 48 in this speed ratio; however, there is no drive through these two gears inasmuch as the one-way clutch 47 overruns. The piston 188 is held in its illustrated position by the holding coil 129, when the transmission is in this speed ratio, and the holding coil functions in addition to the vacuum applied on the piston 188 through the valve 87 to hold the piston in its illustrated position. Therefore, even if the vacuum momentarily decreases, the piston nevertheless remains in its illustrated position corresponding to second speed ratio.

*Vehicle speed above five miles per hour, accelerator depressed, after shift to second speed ratio.*—This condition of the control mechanism is shown in Fig. 7. The clutch 13 remains engaged and the motor 84 for the clutch remains in communication with the atmosphere. The accelerator 74 in being depressed moves the plunger 159 of the valve 80 to the left as seen in the figure to disconnect the conduit 152 with the chamber 153 of the valve; however, the conduit 154 and the chamber 153 remain in communication with the atmosphere through the internal opening of the valve piston 155 of the valve 80. The depression of the accelerator also changes the condition of the accelerator switch 73. The contacts 114 are open, and the current therefore ceases to flow through the contacts; the relay 69 is, however, continued in energized condition by means of the circuit through the contacts 101 of the relay and the contacts 110 of the governor 72.

The contacts 115 of the accelerator switch 73 are closed by the depression of the accelerator and as a result the relay 70 is energized. The switch arm 119 on a depression of the accelerator plunger 117 completes a circuit across the contacts 115, and a circuit is thereby completed from the ignition switch 65 through the switch 67, the contacts 102 of the relay 69, the winding 103 of the relay 70 and the contacts 115 of the accelerator switch 73 to ground. The relay 70 is thus energized to close the contacts 104 and 105 of the relay. Closure of the contacts 104 completes a circuit to ground through the winding 103 of the relay which is in parallel with the circuit from the winding through the contacts 115 of the accelerator switch 73. The relay 70 thereafter thus remains energized regardless of whether or not the accelerator is so moved as to break the circuit between the contacts 115. Closure of the contacts 105 of the relay 70 conditions a circuit through the winding 96 of the relay 68 for energization by the accelerator switch 73 as will be described. During energization of the relay 70 by movement of the accelerator, the transmission remains in second speed ratio, and the shaft 11 is driven through the clutch and gears as has been described.

*Vehicle speed above ten miles per hour, accelerator moved to closed throttle position to shift from second to third speed ratios.*—This condition of the transmission control mechanism is shown in Fig. 8. Above ten miles per hour speed of the vehicle, the contacts 111 of the governor 72 are closed. These contacts are in series with the contacts 116 of the accelerator switch, and these two sets of contacts complete a circuit from the ignition switch 65, through the switch 67, the winding 96 of the relay 68, the contacts 105 of the relay 70, the contacts 106 of the switch 71, the contacts 113 of the accelerator switch 73, and the contacts 111 of the governor 72. The relay 68 is thus energized, and the contacts 98 and 99 of this relay are closed while the contacts 97 of this relay are opened. Closure of the contacts 98 complete an additional circuit from the bottom of the winding 96 of the relay 68 to the contacts 116 of the accelerator switch 73 which is in parallel with the circuit from the winding 96 through the contacts 105, the contacts 106 and the contacts 113 to the contacts 116. By means of this additional circuit, the relay 68 is continued in energized condition regardless of whether or not the accelerator is depressed to open the contacts 113 after the relay 68 has once been energized.

Opening of the contacts 97 of the relay 68 has the effect of breaking the electric circuit through the solenoid 127 for the valve 87 and deenergizing the holding coil 129. The valve piston 185 of the valve 87 thus returns to its original position blocking the associated conduit 186 and connecting the associated conduit 187 with the atmosphere. The spring 190 may then be effective to move the piston 188 to its neutral position. Closure of the contacts 99 of the relay 68 has the effect of completing a circuit from the ignition switch 95 through the switch 67 and the contacts 99 to the solenoid 128 and through the holding coil 130. This energization of the solenoid 128 causes the valve piston 185 of the valve 88 to move to its upper position and connect the associated conduits 186 and 187 while disconnecting the conduit 187 from the atmosphere. Vacuum is thus applied to the right hand end of the piston 188 and functions to move it toward the right as seen in the figure.

The force exerted on the piston 188 by the spring 190 and by the vacuum tending to move the piston toward the right as seen in the figure causes the lug 196 of the shift lever 191 to contact the shift element 194, and this change in relative position between the shift lever 191 and shift element 194 causes the switch 131 to be closed. The switch 131 when closed functions in the same manner as has been described in connection with the upshift from first to second speed ratio, which is illustrated in Fig. 5, to energize the solenoid 126 of the valve 83 and energize the solenoid 79 connected with the butterfly valve 78. This energization of the solenoid 126 causes the valve piston 174 to move upwardly and connect the conduits 173 and 172 for thereby applying vacuum to the motor 84, and the motor is then effective to disengage the clutch 13. The energization of the solenoid 79 functions to move the valve 78 to an engine idling position, so that the engine 12 remains in this condition regardless of whether the accelerator is depressed or not after the shift has once been initiated. With the clutch 13 being disengaged and the engine being maintained in idling condition, the spring 190 and the vacuum exerted on the opposite side of the piston 188 causes the shift lever to shift the shift element in a counterclockwise direction to disengage the collar 55 from the teeth 58 and to engage the collar with the teeth 57. The synchronizer 59 between the collar 55 and teeth 57 is effective to synchronize the speed of the collar and the teeth prior to engagement thereof, and such engagement is easily performed since the clutch 13 is disengaged. The transmission is now conditioned for third speed drive. The piston 188 is held at the limit of its movement to the right by the holding coil 130 as well as by the vacuum applied thereto through the valve 88. The switch 131 opens when the collar 55 is fully engaged with the teeth 57 due to the action of the ball and detent means comprising the spring 199 and ball 198, and the solenoids 126 and 79 are thereby deenergized. The deenergization of the solenoid 126 actuates the valve 83 to reengage the clutch, and the deenergization of the solenoid 79 causes an opening of the butterfly valve 78 so that the opening through the throttle 75 is thereafter solely under the control of the accelerator 74. The solenoids 126 and 79 function to engage the clutch 13 and open the butterfly valve 78 in the same manner as in a shift from first to second speed ratio as is illustrated in Fig. 6. The gear 45 remains engaged with the gear 48 in high speed ratio; however, the one-way clutch 47 overruns, and there is no drive through these gears.

*Vehicle speed above ten M. P. H., accelerator depressed to open throttle position to downshift the transmission from third to second speed ratios.*—This condition of the operating mechanism of the transmission is shown in Fig. 9. The accelerator 74 in its depressed open throttle position functions with the remainder of the operating mechanism to downshift the transmission from third speed ratio to second speed ratio, as when it is desired by the operator to obtain a high torque for passing another vehicle on the road, for example. It is to be noted from Fig. 8 that the relay 68 is kept in energized condition by means of a circuit through the contacts 116 of the accelerator switch 73. When the accelerator 74 is depressed to open-throttle position, the switch arm 120 is moved against the action of the spring 122 by means of the accelerator plunger 117 to break the circuit through the contacts 116, and the relay 68 is thus deenergized. Deenergization of the relay 68 has the effect of opening the contacts 98 and 99 of the relay and of closing the contacts 97 of the relay.

Opening of the contacts 99 of the relay 68 has the effect of deenergizing the holding coil 138 and deenergizing the solenoid 128 of the valve 88 and returning the valve piston 185 of the valve 88 to its position in which it closes the vacuum conduit 186 connected with the valve and opens the associated conduit 187 to the atmosphere. Closing of the contacts 97 of the relay 68 has the effect of completing a circuit from the ignition switch 65 through the switch 67, the contacts 102, the contacts 97, to the solenoid 127 and the holding coil 129. The valve piston 185 of the valve 87 is moved by energization of the solenoid 127 to disconnect the associated conduit 187 with the atmosphere and to connect the associated conduits 186 and 187 together. Due to these changes in condition of the valves 87 and 88, the spring 129 is effective to move the piston 188 toward the left, and the vacuum exerted on the piston through the conduit 187 connected with the valve 87 is also effective to move the piston in this direction. It will be noted that the other relays 69 and 70 remain in their energized conditions, as they were prior to the kickdown by the accelerator.

The piston 188 exerts a force on the shift lever 191 tending to move it in a clockwise direction, and the lug 197 of the shift lever contacts the shift element 194. On such change in relative positions of the shift lever and shift element, the switch 131 is closed, as has been described, and the switch completes electric circuits through the solenoid 79 for the butterfly valve 78 and through the solenoid 126 for the valve 83. Such energization of the solenoid 79 closes the butterfly valve 78 to engine idling position, and such energization of the solenoid 126 raises the piston 174 to disconnect the conduit 172 with the conduit 154 and to connect it instead with the conduit 173. The valve 83 is thus effective to apply vacuum to the motor 84 for disengaging the clutch 13. As is apparent, the switch 131 when closed is effective in the same manner as in an upshift from low speed ratio to second speed ratio which has been heretofore described and is illustrated in Fig. 5.

The clutch 13 is disengaged and the engine 12 has been reduced to idling speed, regardless of the fact that the accelerator 74 is in open throttle position, as has been described, and the piston 188 is then effective to shift the shift lever 191 and collar 55 to engage the collar with the teeth 58. The synchronizer 59 between the teeth and collar acts as before to synchronize the speed of the collar 55 and teeth 58 before engagement thereof. When the piston 188 has completed its stroke, the spring and poppet means including the ball 198 and spring 199 is effective to complete the shift of the collar, and in such a completion of the shift, the switch 131 is opened. Such opening of the switch deenergizes the solenoid 126 for the valve 83 and also the solenoid 179 for the butterfly valve 78, and the drive is then through the transmission in second speed ratio with the clutch 13 being engaged and the throttle 75 being completely under the control of the accelerator 74.

The forty mile per hour contacts 112 of the governor 72 are effective for preventing a kickdown from third speed ratio to second speed ratio by means of the accelerator when the vehicle is traveling above this speed. The contacts 112 connected with ground, it will be noted, are in parallel with the circuit including the contacts 116 of the accelerator switch 73 and the governor contacts 111. Therefore, it will be apparent that an opening of the contacts 116 by a depression of the accelerator 74 when the contacts 112 are closed can have no effect in deenergizing relay 68 for shifting from third speed ratio to second speed ratio. The governor contacts 112 thus advantageously operate to prevent a downshift above the speed at which a downshift would not produce any substantial increase in torque and would allow the engine 12 to attain destructive or harmful speeds.

The coast switch 71 is effective when moved from its position as shown in the drawings connecting the contacts 106 to its lower position connecting the contacts 107 to prevent an upshift from second speed ratio to third speed ratio or to downshift the transmission to second speed ratio if it is in high speed ratio. This switch is useful when the vehicle is descending a steep grade at which time it is desired to use the engine 12 as a brake for the vehicle. As has been described in connection with Fig. 8, the circuit for energizing the winding 96 of the relay 68 for shifting the transmission from second speed ratio to third speed ratio includes the contacts 105, the contacts 106 of the coast switch 71, the contacts 113 of the accelerator switch 73, the contacts 116 of this switch and the governor switch 111. By moving the switch 71 from its illustrated position to its position connecting the contacts 107, this circuit is broken, and a release of the accelerator 74 cannot function to shift the transmission into high speed ratio. The switch 71 in connecting the contacts 107 functions to energize the relay 69 and to maintain it energized. As has been described in connection with Fig. 5, the energization of the relay 69, when the relay 68 is deenergized, causes a shift of the transmission to second speed ratio, a circuit being completed from the ignition switch through the forward direction switch 67, the contacts 102 of the relay 69, the contacts 97 of the relay 68, the solenoid 127 of the valve 87 and the holding coil 129. As has been described in connection with the latter figure, the upshift from first speed to second speed is ordinarily made by a circuit from the ignition switch including the forward direction switch 67, the winding 100 of the relay 69, the contacts 114 of the accelerator switch 73 and the contacts 110 of the governor switch 72; however, the coast switch 71 in connecting the contacts 107 accomplishes this function of energizing the relay 69 simply by grounding the winding 100 of the relay, and it is not necessary to connect the contacts 114 of the accelerator switch 73 by bringing the accelerator to a closed throttle position.

In order to shift the transmission into reverse the gear 45 is simply shifted from its neutral position in which it is shown in Fig. 1 rearwardly to interengage its teeth 53 with the teeth 52 of the element 51 splined on the driven shaft 11. In so moving the gear 45, it is also brought into mesh with the idler gear 50. The forward direction switch 67 is also opened, and this has the effect of maintaining deenergized all of the relays 68, 69 and 70 and the associated electrical circuits. When the vehicle is running in reverse drive, therefore, the shift lever 191 is not shifted by the motor 85, inasmuch as neither of the solenoids 127 and 128 is at any time energized. The solenoid 125 is energized through the governor contacts 109 when the vehicle speed is less than five miles per hour in reverse drive whereby the valve 81 connects the conduits 170 and 152. The clutch 13 is thus engaged and disengaged under the control of the accelerator 74 in reverse drive in the same manner as in forward drive.

*Modified transmission control system*

A modified transmission control system is shown in Fig. 10 in the condition in which it is with the accelerator depressed to open-throttle position. It has been found in certain embodiments of the transmission control system in its form in which it is shown in Figs. 2 to 9 that if the conduits 186 and 187 are too small in diameter, the springs 189 and 190 act so quickly that the vacuum on the piston 188 did not become effective in time to maintain the switch 131 closed for the entire movement of the piston from its second speed ratio position to its third speed ratio position or vice versa. This resulted in an engagement of the clutch 13 before the shift was completed. This modification, as shown in Fig. 10, has been designed to obviate this difficulty, without changing the conduits 186 and 187 or the springs 188 and 190 in any way.

The change of the Fig. 10 embodiment over that shown in Figs. 2 to 9 comprises the addition of a switch 210 actuated by the vacuum motor 85. The switch 210 comprises a pivotally mounted switch arm 211 having a pin and slot connection 212 with the link 192. The switch arm 211 is an electric conductor and cooperates with a contact 213 in the form of an arc. The arc 213 is continued on its ends by portions 214 which are of nonconducting material. The switch arm 211 is connected with one of the contacts 114 of the accelerator switch 73, and the contact 213 of the switch is connected with the contacts 132 of the switch 131. As is apparent, the switch 210 is closed when the piston 188 is in neutral position and is open when the piston 188 is in either of its positions providing the second or third speed ratios through the transmission.

After the transmission has been shifted from second to third speed ratio and the accelerator is depressed to downshift the transmission, the control mechanism is in the condition in which it is shown in Fig. 10, assuming that the spring 189 has acted before the vacuum has had effect on the piston 188 to move the shift lever 191 to neutral position. In this condition of the mechanism, the ball and detent means comprising the ball 198 and the spring 199 is effective to move the shift element 194 to its neutral position, so that the switch 131 is open. In this case, the solenoid 126 for the valve 83 and the solenoid 79 for the butterfly valve 78 are maintained energized, so that the engine is held in engine idling condition and the valve 83 continues to cause the clutch to remain disengaged, by a circuit in lieu of the switch 131 which comprises the switch 210, the contacts 101 of the relay 69 and the contacts 110 of the governor 72. The throttle solenoid 79 and the valve solenoid 126 thus remain energized, although there has been a temporary stop in the movement in the piston 188 resulting in an opening of the switch 131. If the same condition should exist, that is, if the switch 131 should be temporarily opened, when the transmission is being upshifted from second speed ratio to third speed ratio, the switch 210 functions in the same manner to complete circuits through the solenoids 79 and 126 for maintaining the clutch 13 disengaged and the throttle valve 78 closed during the shift.

We wish it to be understood that our invention is not to be limited to the specific constructions and arrangements shown and described except only insofar as the claims may be so limited, as it will be apparent to those skilled in the art that changes may be made without departing from the principles of the invention.

We claim:

1. In transmission mechanism, the combination of a drive shaft, a driven shaft, gearing for providing a plurality of speed ratios between said shafts and including a positive type clutch for establishing one of the speed ratios, a friction clutch connected to said drive shaft, a power cylinder for shifting said positive type clutch, power mechanism for disengaging said friction clutch, and a lost motion switch actuated by said power cylinder and put into a changed electrical condition when the power cylinder is operative to shift the positive clutch, said switch being connected with said power mechanism to cause a disengagement of said friction clutch when said power cylinder is operative for shifting said positive clutch.

2. In transmission mechanism, the combination of a drive shaft, a driven shaft, gearing for providing a plurality of speed ratios between said shafts and including a positive type clutch for establishing one of the speed ratios, a friction clutch connected to said drive shaft, a power cylinder for shifting said positive clutch and connected to the positive clutch by means of two levers having a lost motion between the levers, power mechanism for disengaging said friction clutch, and switch means actuated by said levers and put into a changed electrical condition when the power cylinder is operative to shift the positive clutch, said switch means being connected with said power mechanism to cause a disengagement of said friction clutch when said power cylinder is operative for shifting said positive clutch.

3. In transmission mechanism, the combination of a drive shaft, a driven shaft, gearing for providing a plurality of speed ratios between said shafts and including a positive type clutch for establishing one of the speed ratios, a friction clutch connected to said drive shaft, a power cylinder for shifting said positive clutch and connected with the positive clutch by means of a lost motion connection, said connection comprising a lever connected with the power cylinder, a second lever connected with said positive clutch and an abutment means on said first lever contacting said second lever after the first lever has moved a predetermined distance, power mechanism for disengaging said friction clutch, and an electrical switch connected with said levers whereby the switch is closed when said power cylinder is operative to move said first lever and thereby also said second lever through said lost motion connection, said switch being connected with said power mechanism to cause a disengagement of said friction clutch when said power cylinder is operative for shifting said positive clutch.

4. In transmission mechanism, the combination of a drive shaft, a driven shaft, gearing for providing a plurality of speed ratios between said shafts and including a positive type clutch for establishing one of the speed ratios, a friction clutch connected to said drive shaft, a power cylinder having a connection with said positive clutch to shift the clutch, said connection comprising two levers having a lost motion between them, power mechanism for disengaging said friction clutch, and an electric switch adapted to be actuated by said two levers and being put into a changed electrical condition when the power cylinder is operative to shift the positive clutch, said switch being connected with said power mechanism to cause a disengagement of said friction clutch when said power cylinder is operative for shifting said positive clutch, and spring means for returning said levers relative to each other and thereby said switch to their original conditions after a shift of the positive clutch has been completed either into or out of engaged position.

5. In transmission mechanism, the combination of a drive shaft, a driven shaft, gearing for providing a plurality of speed ratios between said shafts and including a positive type clutch for establishing one of the speed ratios, a friction clutch connected with said drive shaft, a power cylinder having a lost motion connection for shifting said positive clutch, said connection comprising two levers, a first one of said levers being connected with the power cylinder and the other or second lever being connected with said positive clutch, and abutment means on one of said levers for causing a movement of said second lever when said first lever has travelled a predetermined distance, power mechanism for disengaging said friction clutch, a switch connected with said levers and being closed when said power cylinder is operative to shift said positive clutch, said switch being connected with said power mechanism to cause a disengagement of said friction clutch when said power cylinder is operative to shift said positive clutch, and ball and detent means operating on said second lever for causing the second lever to move into the same position relative to said first lever after the shift has been completed as it was prior to a shift whereby to open said switch and to cause an engagement of said friction clutch.

6. In transmission mechanism, the combination of a drive shaft, a driven shaft, gearing for providing a plurality of speed ratios between said shafts and including a positive type clutch for establishing one of the speed ratios, a friction clutch connected to the drive shaft, power mechanism for shifting said positive clutch, power mechanism for disengaging said friction clutch and including a solenoid-operated valve, and a switch means actuated by said first named power mechanism and connected with said valve to cause a disengagement of said friction clutch when said first-named power mechanism is operative for shifting said positive clutch.

7. In transmission mechanism, the combination of a drive shaft, a driven shaft, gearing for providing a plurality of speed ratios between said shafts and including a positive type clutch for establishing one of the speed ratios, a friction clutch connected to said drive shaft, a power cylinder having a lost-motion connection with said positive clutch for thereby shifting the clutch, a switch actuated by said lost-motion connection and being put into a different electrical condition when said power cylinder is operative for shifting the positive clutch, and power mechanism for disengaging said friction clutch and including a solenoid-operated valve, said switch being connected with said valve and being adapted to cause the disengagement of said friction clutch when said power cylinder is operative for shifting the positive clutch.

8. In transmission mechanism, the combination of a drive shaft, a driven shaft, gearing for providing a plurality of speed ratios between said shafts and including a positive type clutch for establishing one of the speed ratios, a friction clutch connected to said drive shaft, a suction cylinder having a lost-motion connection with said positive clutch for shifting the clutch, said connection comprising a first lever connected with said cylinder and a second lever connected with said positive clutch and abutment means on one of said levers whereby said first lever moves said second lever when said first lever has been given a predetermined movement, a switch actuated by said two levers and adapted to be closed when said suction cylinder is operative through said connection to shift said jaw clutch, and suction power mechanism for disengaging said friction clutch and including a solenoid actuated valve, said valve being connected with said switch whereby the friction clutch is disengaged when said suction cylinder is operative for shifting said positive clutch.

9. In transmission mechanism for an automotive vehicle, the combination of a drive shaft, a driven shaft, gearing for providing a plurality of speed ratios between said shafts and including a positive type clutch for establishing one of the speed ratios, a friction clutch connected to one of said shafts, power mechanism for shifting said positive clutch, power mechanism for disengaging said friction clutch, switch means actuated by said first-named power mechanism and connected with the second-named power mechanism to cause a disengagement of said friction clutch while the positive clutch is being shifted, an accelerator for the vehicle, and means connecting said accelerator and said first-named power mechanism whereby the latter mechanism is actuated when the accelerator is moved to one of the limits of its movement.

10. In transmission mechanism for an automotive vehicle, the combination of a drive shaft, a driven shaft, gearing for providing a plurality of speed ratios between said shafts and including a positive type clutch for establishing one of the speed ratios, a friction clutch connected to one of said shafts, power mechanism for shifting said positive clutch, power mechanism for disengaging said friction clutch, a lost-motion electric switch actuated by said first named power mechanism and put into changed electrical condition when the first-named power mechanism is operative, said switch being connected with said second-named power mechanism to cause a disengagement of said friction clutch while the positive clutch is being shifted, an accelerator, and means connecting said accelerator and said first-named power mechanism whereby the power mechanism is rendered operative to shift the jaw clutch when the accelerator is moved to one of the limits of its movement.

11. In transmission mechanism for an automotive vehicle, the combination of a drive shaft, a driven shaft, gearing for providing a plurality of speed ratios between said shafts and including a positive type clutch for establishing one of the speed ratios, a friction clutch connected with said drive shaft, a power cylinder having a connection with said positive clutch for shifting the clutch, said connection including two levers one connected with said power cylinder and the other with said positive clutch and providing a lost-motion between the levers, an electric switch connected with said levers and adapted to be put into a changed electric condition when said first lever is effective to shift said second lever and said positive clutch, power mechanism for disengaging said friction clutch and being connected with said switch whereby the power mechanism is rendered operative to cause a disengagement of the clutch while the positive clutch is being shifted, an accelerator for the vehicle, and means connecting said accelerator and said power cylinder whereby the power cylinder is rendered operative to shift the jaw clutch when the accelerator is moved to one of the limits of its movement.

12. In transmission mechanism for an automotive vehicle, the combination of a drive shaft, a driven shaft, gearing for providing a plurality of speed ratios between said shafts and including a positive-type clutch for establishing one of the speed ratios, a friction clutch connected with said drive shaft, a power cylinder for shifting said positive clutch and having a lost-motion connection with the positive clutch, said connection comprising two levers, a first one connected with the power cylinder and the other or second one connected with the positive clutch and abutment means on one of said levers whereby said first lever is only effective to move said second lever after a predetermined movement of the first lever, ball and detent means effective on said second lever for moving said second lever back to its original position with respect to the first lever after a shift of the positive clutch has been completed, a switch actuated by said two levers and being closed while said power cylinder is effective for shifting said jaw clutch, power mechanism for disengaging said friction clutch and connected with said switch whereby the friction clutch is disengaged when said switch is closed, an accelerator for said vehicle, and means connecting said accelerator and said power cylinder whereby the power cylinder is rendered operative to shift the positive clutch when said accelerator is moved to one of the limits of its movement.

13. In transmission mechanism, the combination of a drive shaft, a driven shaft, gearing for providing a plurality of speed ratios between said shafts and including a positive type clutch for establishing one of the speed ratios, a friction clutch connected to said drive shaft, a vacuum power cylinder having a lost motion connection with said positive clutch for shifting the clutch, said connection comprising a lever connected with the power cylinder, a lever connected with said positive clutch and abutment means on one of said levers whereby said first lever may have a predetermined movement before moving said second lever and thereby said jaw clutch, a vacuum motor for disengaging said friction clutch, and a solenoid-operated valve connected with said vacuum motor for controlling the motor, said solenoid being connected with said switch whereby the friction clutch is disengaged when said switch is closed, an accelerator for said vehicle, and means connecting said accelerator and said vacuum cylinder whereby to cause a shifting of said positive clutch when the accelerator is moved to one of the limits of its movement.

14. In transmission mechanism, the combination of a drive shaft, a driven shaft, gearing for providing two different speed ratios between said shafts and including a positive clutch for establishing each of the speed ratios, a movable clutch element for engaging and disengaging the clutches, an engine for driving said drive shaft, a clutch between said engine and said drive shaft, a motor for said movable element for disestablishing one of said speed ratios and establishing the other speed ratio when the motor is operative, an electric switch cooperating with said motor and said movable element whereby the switch is put into changed electrical condition when the motor is operative, and electrically controlled means for disengaging said clutch and connected with said electric switch whereby said clutch is disengaged when said motor is operative.

15. In transmission mechanism, the combination of a drive shaft, a driven shaft, gearing for providing two different speed ratios between said shafts and including a positive type clutch for establishing each of the speed ratios, a movable clutch element for engaging and disengaging said clutches, an engine for driving said drive shaft, a clutch between said engine and drive shaft, an accelerator for controlling said engine, a motor for said movable element for disestablishing one of said speed ratios and establishing the other speed ratio when the motor is operative, an electric switch cooperating with said motor and said movable element whereby the switch is put into a changed electrical condition when the motor is operative, and electrically controlled means connected with said switch whereby said last named clutch is disengaged when the electric switch is put in its said changed electrical condition, said accelerator being operatively connected with said motor whereby the motor is operative when the accelerator is moved to one of the limits of its movement.

16. In transmission mechanism, the combination of a drive shaft, a driven shaft, gearing for providing a high speed ratio and a low speed ratio between said shafts and including a positive type clutch for establishing each of the speed ratios, said clutches including a movable clutch element for engaging and disengaging the clutches, an engine for driving said drive shaft, an accelerator for controlling said engine, a friction clutch between said engine and said drive shaft, a shift lever having a lost-motion connection with said movable clutch element for shifting the clutch element, a motor connected with said shift lever, an electric switch connected with said clutch element and said shift lever and being electrically closed due to said lost-motion connection when said motor is operative to shift said lever and thereby said clutch element, electrically controlled clutch disengaging means and connected with said switch whereby the friction clutch is disengaged when said motor is operative, and means interconnecting said motor and said accelerator whereby the motor is rendered operative to shift the clutch element to downshift the transmission mechanism from said high speed ratio to said low speed ratio when the accelerator is moved to its open throttle position.

17. In transmission mechanism, the combination of a drive shaft, a driven shaft, gearing for providing a pair of speed ratios between said shafts and including a positive type clutch for establishing each of the speed ratios, said clutches including a movable clutch element for engaging and disengaging said clutches, a shift lever having a lost-motion connection with said movable clutch element for giving shifting movement to the clutch element, an engine for driving said drive shaft, a friction clutch between said engine and said drive shaft, a motor for said movable clutch element for disengaging one of said positive clutches and moving the clutch element a portion of the way to its other engaged position, spring detent means for completing the movement of the clutch element to its last named position, an electric switch connected with said shift lever and shiftable clutch element and arranged to be in electrically closed condition when said motor is operative, electrically responsive clutch disengaging means connected with said switch and operative to disengage said friction clutch when the switch is in its closed electrical condition, and an accelerator for said engine and connected with said motor for rendering the motor operative when the accelerator is moved to one of the limits of its movement.

18. In transmission mechanism, the combination of a drive shaft, a driven shaft, gearing for providing a plurality of speed ratios between said shafts and including a coupling means for establishing one of the speed ratios, said coupling means including a movable element for engaging and disengaging the coupling means, an engine for driving said drive shaft and including a throttle means, an accelerator connected with said throttle means, a clutch between said engine and said drive shaft, a motor for said movable element for disestablishing said one speed ratio when the motor is operative, said motor being under the control of said accelerator whereby the motor is rendered operative when the accelerator is moved to one of the limits of its movement, and means rendered operative by said motor when the latter is operative for substantially closing said throttle means and for disengaging said clutch.

19. In transmission mechanism, the combination of a drive shaft, a driven shaft, gearing for providing a plurality of speed ratios between said shafts and including a positive type clutch for establishing one of the speed ratios, said clutch including a movable element for engaging and disengaging the clutch, an engine for driving said drive shaft and including a throttle means, an accelerator connected with said throttle means, a clutch between said engine and said drive shaft, a motor for said movable element for disestablishing said one speed ratio when the motor is operative, said motor being under the control of said accelerator whereby the motor is rendered operative when the accelerator is moved to its open throttle position, and means rendered operative by said motor when the latter is operative for substantially closing said throttle means and for disengaging said second named clutch.

20. In transmission mechanism, the combination of a drive shaft, a driven shaft, gearing for providing a high speed ratio and a low speed ratio between said shafts and including a positive type clutch for establishing each of the speed ratios, a movable clutch element for engaging and disengaging said clutches, an engine for driving said drive shaft and including a throttle means, an accelerator connected with said throttle means, a clutch between said engine and said drive shaft, a motor for said movable element for disestablishing said high speed ratio and establishing said low speed ratio when the motor is operative, said motor being under the control of said accelerator whereby the motor is rendered operative when the accelerator is moved to its open throttle position, and means rendered operative by said motor when the latter is operative for substantially closing said throttle means and for disengaging said engine clutch until the shift from one speed ratio to the other is completed.

21. In transmission mechanism, the combination of a drive shaft, a driven shaft, gearing for providing two different speed ratios between said shafts and including a positive type clutch for establishing each of the speed ratios, said clutches including a movable clutch element for engaging and disengaging the clutches, an engine for driving said drive shaft and including a throttle, a clutch between said engine and said drive shaft, a motor for said movable clutch element for disengaging one of said positive clutches and engaging the other positive clutch when the motor is operative, an electric switch cooperating with said motor and said movable clutch element and adapted to be put into changed electrical condition when said motor is operative, electric throttle operating means connected with said switch whereby when the switch is in its said changed condition said throttle is substantially closed, an electrically controlled clutch disengaging means connected with said switch for disengaging said engine clutch when said switch is in its changed condition.

22. In transmission mechanism, the combination of a drive shaft, a driven shaft, gearing for providing two different speed ratios between said shafts and including a positive type clutch for establishing each of the speed ratios, said clutches including a movable clutch element for engaging and disengaging the clutches, an engine for driving said drive shaft and including a throttle means, an accelerator connected with said throttle means, a clutch between said engine and said drive shaft, a motor for said movable clutch element for disestablishing one of said speed ratios and establishing the other speed ratio when the motor is operative, said motor being controlled by said accelerator whereby the motor is rendered operative when the accelerator is moved to one of the limits of its movement, an electrical switch connected with said motor and movable clutch element and adapted to be put into changed electrical condition when said motor is operative to move the clutch element, electric throttle control mechanism connected with said switch for substantially closing said throttle means when the switch is in its said changed electrical condition, and electrically controlled clutch disengaging means connected with said switch for disengaging said engine clutch when said switch is in its said changed electrical condition.

23. In transmission mechanism, the combination of a drive shaft, a driven shaft, gearing for providing a high speed ratio and a low speed ratio between said shafts and including a positive type clutch for establishing each of the speed ratios, said clutches including a movable element for engaging and disengaging the clutches, an engine for driving said drive shaft and including a throttle means, an accelerator connected with said throttle means, a friction clutch between said engine and said drive shaft, a shift lever having a lost-motion connection with said shiftable clutch element for moving the element when the shift lever is moved, a motor connected with said shift lever for disengaging one of said positive clutches and engaging the other positive clutch to disestablish said high speed ratio and establish said low speed ratio when the motor is operative, an electric switch connected with said shift lever and said shiftable element and being closed when the motor is operative to move the shift lever due to said lost-motion connection, electric throttle operating means connected with said switch for substantially closing said throttle means when said switch is closed, an electrically controlled clutch disengaging means connected with said switch and rendered operative to disengage said friction clutch when said switch is closed, said accelerator being operatively connected with said motor for rendering the motor operative when the accelerator is moved to its open throttle position to downshift the transmission mechanism from its high speed ratio to its low speed ratio.

24. In transmission mechanism, the combination of a drive shaft, a driven shaft, gearing for providing two different speed ratios between said shafts and including a positive type clutch for establishing each of the speed ratios, a movable clutch element for engaging and disengaging said clutches, a shift lever having a lost motion connection with said clutch element for shifting the clutch element, an engine for driving said drive shaft and including a throttle means, an accelerator connected with said throttle means, a friction clutch between said engine and said drive shaft, a motor for said shift lever which when operative functions to move the shift lever and thereby the shiftable clutch element to disengage one of said positive type clutches and move the clutch element a portion of the distance to its position in which the other positive type clutch is engaged, detent means for completing the movement of said positive clutch element toward its said last named position, a switch connected with said shift lever and said movable clutch element and adapted to be put into changed electrical condition when said motor is operative to move the clutch element due to said lost-motion connection, electric throttle closing means connected with said switch and adapted to be operative when the switch is in its said changed electrical condition, and electric clutch disengaging means connecting with said switch and adapted to be operative when the switch is in its said changed electrical condition, said accelerator being operatively connected with said motor whereby the motor is rendered operative when the accelerator is moved to one of the limits of its movement whereby to shift the transmission mechanism.

25. In transmission mechanism, the combination of a drive shaft, a driven shaft, an engine for driving said drive shaft, an accelerator for controlling said engine, change speed gearing between said shafts, a shift element for said gearing for changing the speed ratio therethrough, a motor having a connection with the shift element for shifting the element, means under the control of the accelerator for actuating said motor to shift the shiftable element when the accelerator is moved to one of the limits of its movement, an electric switch connected with said motor and shift element and adapted to be put into a changed electrical condition when the motor exerts a force to shift the element, means for interrupting the torque delivered by said engine and connected with said switch and rendered operative when the switch is in its said changed electrical condition, and another switch connected in parallel with said first named switch and actuated by said motor, said second named switch being put into a condition to render said torque interrupting means operative when said motor is in neutral condition whereby if the motor is temporarily inoperative in its neutral condition after partially completing a shift of said element, said torque interrupting means nevertheless remains operative.

26. In transmission mechanism, the combination of a drive shaft, a driven shaft, an engine for driving said drive shaft, an accelerator for said engine, change speed gearing between said shafts, a shift element for said gearing for changing the speed ratio therethrough, a piston-type motor having its piston connected with the shift element for shifting the element, means under the control of the accelerator for energizing said motor to shift the shift element when the accelerator is moved to one of the limits of its movement, a pair of springs acting on said piston for yieldingly maintaining it in its neutral position, an electric switch connected with said motor and shift element and adapted to be put into a changed electrical condition when the motor exerts a force to shift the element, means for interrupting the torque from said engine and connected with said switch and rendered operative when the switch is in its said changed electrical condition, and another switch connected in parallel with said first named switch and actuated by said motor, said second named switch being put into a condition to render said torque interrupting means operative when said motor is in neutral condition whereby if the motor is temporarily inoperative in such condition after one of said springs has partially completed a shift of said element, said torque interrupting means nevertheless remains operative.

27. In transmission mechanism, the combination of a drive shaft, a driven shaft, an engine for driving said drive shaft, an accelerator for said engine, change speed gearing between said shafts, a shift element for said gearing for changing the speed ratio therethrough, a shift lever having a lost-motion connection with said shift element and being adapted to shift the element, a motor connected with said shift lever for shifting the element and lever and being under the control of said accelerator to be energized for a shift when the accelerator is moved to one of the limits of its movement, an electric switch connected with said shift lever and the shift element and being closed due to said lost-motion connection between the lever and the element when the motor exerts a force to shift the lever and element, means for interrupting the torque of said engine and connected with said switch and rendered operative when the switch is closed, and another switch connected in parallel with said first named switch and actuated by said motor, said second named switch being closed to render said torque interrupting means operative when said motor is in neutral condition whereby if the motor is temporarily inoperative in neutral condition after partially completing a shift of said element, said torque interrupting means nevertheless remains operative.

28. In transmission mechanism, the combination of a drive shaft, a driven shaft, an engine for driving said drive shaft, an accelerator for said engine, change speed gearing between said shafts, a shift element for said gearing for changing the speed ratio therethrough and having a neutral position and an operative position on each side thereof, a piston type motor having its piston connected with the shift element for shifting the element, a pair of springs for yieldingly holding said piston in its neutral position, means under the control of the accelerator for shifting the piston in one direction or the other to render different speed ratios operative when the accelerator is moved to one or the other of its limits of movement, an electric switch connected with said motor and shift element and adapted to be closed when the piston exerts a force to shift the element means for interrupting the torque from said motor and connected with said switch and rendered operative when the switch is closed, and another switch connected in parallel with said first named switch and actuated by said motor, said second named switch being closed when the motor is in neutral condition whereby if the motor is temporarily inoperative in neutral position after partially completing a shift from one speed ratio to the other under the action of one of said springs, said torque interrupting means nevertheless remains operative.

29. In transmission mechanism, the combination of a drive shaft, a driven shaft, an engine for driving said drive shaft, a clutch between said engine and drive shaft, an accelerator for said engine, change speed gearing between said shafts, a shift element for said gearing for changing the speed ratio therethrough, a piston-type motor having its piston connected with the shift element for shifting the element, means under the control of the accelerator for energizing said motor to shift said element when the accelerator is moved to one of the limits of its movement, an electric switch connected with said motor and shift element and adapted to be closed when the motor exerts a force to shift the element, electrically controlled means for disengaging said clutch and connected with said switch and rendered operative when the switch is closed, and another switch connected in parallel with said first named switch and actuated by said motor, said second named switch being closed when motor is in neutral position whereby if the motor is temporarily inoperative in neutral condition after partially completing a shift of said element, said clutch disengaging means nevertheless remains operative.

30. In transmission mechanism, the combination of a drive shaft, a driven shaft, an engine for driving said drive shaft and having a throttle means, a clutch between said engine and drive shaft, an accelerator connected with said throttle means, change speed gearing between said shafts, a shift element for said gearing for changing the speed ratio therethrough and having a neutral position and an operative position on each side thereof, a piston-type motor having its piston connected with said shift element by means of a lost-motion connection and being adapted to shift the element, an electric switch connected with said motor and the shift element and adapted to be closed when the motor exerts a force to shift the element due to said lost-motion connection, electrically controlled means for disengaging said clutch, electrically controlled means for substantially closing said throttle means, both of said two last named means being connected with said switch and being rendered operative when the switch is closed, and another switch connected in parallel with said first named switch and actuated by said motor, said second named switch being closed to render said clutch disengaging means and said throttle closing means operative when said motor is in neutral condition whereby if the motor is temporarily inoperative in said condition after partially completing a shift of said element, said clutch disengaging means and said throttle closing means remain operative.

31. In transmission mechanism, the combination of a drive shaft, a driven shaft, an engine for driving said drive shaft and having a throttle means, an accelerator connected to said throttle means, change speed gearing between said shafts, a shift element for said gearing for changing the speed ratio therethrough and having a neutral and an operative position on each side thereof, a shift lever having a lost-motion connection with said shift element, a piston-type motor having its piston connected to said shift lever for shifting the element and the lever, a pair of springs for yieldingly holding said piston in its neutral position, an electric switch connected with said shift element and the shift lever and adapted to be closed when the motor exerts a force to shift said element, electrically controlled means for disengaging said clutch, electrically controlled means for substantially closing said throttle means, both of said two last named means being connected with said switch and rendered operative when the switch is closed, and another switch connected in a parallel circuit with said first named switch and actuated by said motor, said second named switch rendering said clutch disengaging means and said throttle closing means operative when said motor is in neutral condition whereby if the motor is temporarily inoperative after partially completing a shift from one speed ratio to the other by action of one of said springs said clutch disengaging means and said throttle closing means nevertheless remain operative, a governor responsive to the speed of said driven shaft, and means cooperating with said governor and said accelerator for completing said electric circuit only when the accelerator is moved to one of the limits of its movement and the speed of the driven shaft is above a predetermined value.

32. In transmission mechanism, the combination of a drive shaft, a driven shaft, an engine for driving said drive shaft, a throttle for said engine, a clutch between said engine and said drive shaft, power operated means for disengaging said clutch, power operated means for substantially closing said throttle, change speed gearing between said shafts, a shift element for changing the speed ratio through said gearing, a shift lever having a lost-motion connection with said shift element, and means responsive to the relative movement between said shift lever and element for energizing said clutch disengaging means and said throttle closing means when said shift lever is utilized for shifting said shift element.

33. In transmission mechanism, the combination of a drive shaft, a driven shaft, an engine for driving said drive shaft, a throttle for said engine, a clutch between said engine and drive shaft, electrically controlled means for substantially closing said throttle, change speed gearing between said shafts, a shift element for changing the speed ratio through said gearing, a shift lever having a lost-motion connection with said shift element, and an electric switch connected with said shift lever and said shift element and responsive to the relative movement between the lever and element whereby to be closed when the shift lever is utilized for shifting, said shifting element, said electric switch being connected with both of said electrically controlled means for substantially closing said throttle and for disengaging said clutch when the shift lever is so utilized.

34. In transmission mechanism, the combination of a drive shaft, a driven shaft, change speed gearing between said shafts, a shift element for said gearing for changing the speed ratio therethrough, a motor having a connection with the shift element for shifting the element, an electric switch connected with said motor and shift element and adapted to be put into a changed electrical condition when the motor exerts a force to shift the element, means for permitting the shift of said shiftable element free of torque which would tend to prevent such a shift and connected with said switch and rendered operative when the switch is in its said changed electrical condition, and another switch connected in parallel with said first named switch and actuated by said motor, said second named switch being put into a condition to render said first named means operative when said motor is in neutral condition whereby if the motor is temporarily inoperative in such condition said first named means nevertheless remains operative.

35. In transmission mechanism, the combination of a drive shaft, a driven shaft, change speed gearing between said shafts, a shift element for said gearing for changing the speed ratio therethrough, a piston-type motor having its piston connected with the shift element for shifting the element, a pair of springs for yieldingly holding the piston in a neutral position, an electric switch connected with said piston and shift element and adapted to be put into a changed electrical condition when the piston exerts a force to shift the element, means for permitting the shift of said shiftable element free of torque which would tend to prevent such a shift and connected with said switch and rendered operative when the switch is in its said changed electrical condition, and another switch connected in parallel with said first named switch and actuated by said piston, said second named switch being put into condition to render said first named means operative when said piston is in its neutral position, whereby if the motor is temporarily inoperative when its piston is in neutral position due to the action of one of said springs, said first named means nevertheless remains operative.

36. In transmission mechanism, the combination of a drive shaft, a driven shaft, change speed gearing between said shafts, a shift element for said gearing for changing the speed ratio therethrough, a shift lever having a lost-motion connection with said element and being adapted to shift the element, a motor having a connection with the shift lever for shifting the lever and element, an electric switch connected with said shift lever and shift element and adapted to be closed due to said lost-motion connection when the motor exerts a force to shift the element, means for permitting the shift of said shiftable element free of torque which would tend to prevent such a shift and connected with said switch and rendered operative when the switch is closed, and another switch connected in parallel with said first named switch and actuated by said motor, said second named switch being closed when said motor is in neutral condition whereby if the motor is temporarily inoperative in its neutral condition after partially completing a shift of said element, said first named means nevertheless remains operative.

37. In transmission mechanism, the combination of a drive shaft, a driven shaft, an engine for driving said drive shaft, a clutch between said engine and drive shaft, change speed gearing between said shafts, a shift element for said gearing for changing the speed ratio therethrough, a motor having a connection with the shift element for shifting the element, an electric switch connected with said motor and shift element and adapted to be closed when the motor exerts a force to shift the element, electrically controlled means for disengaging said clutch and connected with said switch and rendered operative to disengage the clutch when the switch is closed, another switch connected in parallel with said first named switch and actuated by said motor, said second named switch being closed to render said clutch disengaging means operative when said motor is in neutral condition whereby if the motor is temporarily inoperative in such condition after partially completing a shift of said shift element, said clutch disengaging means nevertheless remains operative.

38. In transmission mechanism, the combination of a drive shaft, a driven shaft, an engine for driving said drive shaft, a clutch between said engine and drive shaft, said engine including a throttle, change speed gearing between said shafts, a shift element for said gearing for changing the speed ratio therethrough, a piston-type motor having its piston connected with the shift element for shifting the element, a pair of springs for yieldingly holding said piston in a neutral position, an electric switch connected with said motor and said shift element and adapted to be closed when the motor exerts a force to shift the element, electrically controlled means for disengaging said clutch, electrically controlled means for substantially closing said throttle, both of said last two named means being connected with said switch and being rendered operative when the switch is closed, and another switch connected in parallel with said first named switch and actuated by said motor, said second named switch being closed when said motor is in neutral condition whereby if the motor is temporarily inoperative after its piston has been moved to its neutral position by one of said springs, said throttle closing means and said clutch disengaging means nevertheless remain operative.

39. In transmission mechanism, the combination of a drive shaft, a driven shaft, change speed gearing between said shafts, a shift element for said gearing for changing the speed ratio therethrough, a piston-type motor having its piston connected with the shift element for shifting the element, an electric switch connected with said piston and shift element and adapted to be closed when the motor exerts a force to shift the element, means for permitting the shift of said shiftable element free of torque which would tend to prevent such a shift and connected with said switch and rendered operative when the switch is closed, another switch connected in parallel with said first named switch and actuated by said motor, said second named switch being closed to render said first named means operative when said piston is in neutral position whereby if the motor is temporarily inoperative in such condition after partially completing a shift of said element said first named means nevertheless remains operative, and switch means connected in series with said second named switch and manually operable for selectively rendering said second named switch effective or ineffective.

40. In transmission mechanism, the combination of a drive shaft, a driven shaft, gearing for providing a plurality of speed ratios between said shafts, and including an engaging means for establishing one of the speed ratios, an engine for driving said drive shaft and including a throttle means, a clutch between said motor and drive shaft, an accelerator connected with said throttle means and having a closed throttle position and an open throttle position, and vacuum means under the control of said accelerator for disengaging said engaging means to disestablish said one speed ratio when said accelerator is moved to its open throttle position and including a second vacuum means controlled by said first-named vacuum means for automatically temporarily disengaging said clutch, and means for automatically temporarily substantially closing said throttle means to thereby reduce the speed of said engine while the said engaging means is being disengaged.

41. In transmission mechanism, the combination of a drive shaft, a driven shaft, gearing for providing a plurality of speed ratios between said shafts and including a positive type clutch for establishing one of the speed ratios, an engine for driving said drive shaft and having a throttle means, an accelerator connected with said throttle and movable to an open throttle position, a clutch between said engine and drive shaft, fluid operated means for disengaging said positive type clutch to disestablish said one speed ratio when said accelerator is moved to its said open throttle position and including a second fluid operated means controlled by said first fluid operated means for automatically temporarily disengaging said engine clutch, and means for automatically temporarily substantially closing said throttle means to thereby reduce the speed of said engine while said positive clutch is being disengaged.

42. In transmission mechanism, the combination of a drive shaft, a driven shaft, gearing for providing a plurality of speed ratios between said shafts and including a positive type clutch for establishing one of the speed ratios, an engine for driving said drive shaft and including a throttle means, an eccelerator connected with said throttle means and having an open throttle position and a closed throttle position, a clutch between said engine and drive shaft, a vacuum motor under the control of said accelerator for disengaging said positive type clutch to disestablish said one speed ratio on said accelerator being moved to its open throttle position, a second vacuum motor controlled by said first-named vacuum motor for automatically temporarily disengaging said engine clutch, and means for automatically temporarily substantially closing said throttle means to thereby reduce the speed of said engine while the positive clutch is being disengaged.

43. In transmission mechanism, the combination of a drive shaft, a driven shaft, gearing for providing two different speed ratios between said shafts and including a positive type engaging means for establishing each of said ratios, an engine for driving said drive shaft and including a throttle means, an accelerator connected with said throttle and movable to an open throttle position, a clutch between said engine and drive shaft, fluid operated means for disengaging one of said engaging means and engaging the other engaging means to thereby shift the transmission mechanism from one speed ratio to the other speed ratio when said accelerator is moved to its said open throttle position a second fluid operated means controlled by said first-named fluid operated means for automatically temporarily disengaging said clutch, and means for automatically temporarily substantially closing said throttle means to thereby reduce the speed of said engine while the shift is taking place.

44. In transmission mechanism, the combination of a drive shaft, a driven shaft, gearing for providing two different speed ratios between said shafts and including a positive type clutch for establishing each of said speed ratios, an engine for driving said drive shaft and including a throttle means, an accelerator connected with said throttle means and having an open throttle and a closed throttle position, a clutch between said engine and the drive shaft, and means under the control of said accelerator for disengaging one of said positive type clutches and engaging the other positive type clutch for thereby shifting the transmission mechanism from one speed ratio to the other speed ratio when the accelerator is moved to its open throttle position, a fluid motor controlled by said means for automatically temporarily disengaging said clutch between the engine and the drive shaft, and means for automatically temporarily substantially closing said throttle means to thereby reduce the speed of said engine when the shift is taking place.

45. In transmission mechanism, the combination of a drive shaft, a driven shaft, gearing for providing a high speed ratio and a low speed ratio between said shafts and including a positive type clutch for establishing said high speed ratio and another positive type clutch for establishing said low speed ratio, an engine for driving said drive shaft and including a throttle means, an accelerator connected with said throttle means and having an open throttle and a closed throttle position, a friction clutch between said engine and said drive shaft, means under the control of said accelerator for disengaging said first named positive clutch and engaging the other positive clutch to downshift the transmission mechanism when the accelerator is moved to its open throttle position, a fluid motor controlled by said means for automatically temporarily disengaging said clutch between said engine and drive shaft, and means for automatically temporarily substantially closing said throttle means to thereby reduce the speed of said engine when the downshift is taking place.

46. In a transmission mechanism, the combination of a drive shaft, a driven shaft, means for providing a drive between said shafts and including a positive type engaging means and a friction type engaging means for establishing said drive, a motor for shifting said positive engaging means, a source of power for operating said motor, a motor for actuating said friction type engaging means, and means including a switch actuated by said first-named motor and connected with said second-named motor to cause a disengagement of said friction type engaging means when the first-named motor is effective to shift the positive type engaging means.

47. In transmission mechanism, the combination of a drive shaft, a driven shaft, gearing for providing a plurality of speed ratios between said shafts and including a positive type engaging means and a friction type engaging means for establishing one of the speed ratios, a motor for shifting said positive type engaging means, a source of power for operating said motor, a motor for actuating said friction type engaging means, and means including a lost motion electric switch actuated by said first-named motor and put into a changed electrical condition when the latter motor is operative and connected with said second-named motor to cause a disengagement of said friction type engaging means when said first-named motor is operative for shifting said positive engaging means.

PALMER ORR.
GEORGE E. FLINN.

REFERENCES CITED

The following references are of record in the file of this patent:

UNITED STATES PATENTS

| Number | Name | Date |
|---|---|---|
| 1,911,599 | Bloxsom | May 30, 1933 |
| 1,979,488 | Perez | Nov. 6, 1934 |
| 2,031,807 | Werner | Feb. 25, 1936 |
| 2,051,553 | Fleischel | Aug. 18, 1936 |
| 2,062,104 | Prince | Nov. 24, 1936 |
| 2,104,608 | Cox et al. | Jan. 4, 1938 |
| 2,118,978 | Maybach | May 31, 1938 |
| 2,129,259 | Boughton | Sept. 6, 1938 |
| 2,137,953 | Rowley | Nov. 22, 1938 |
| 2,137,961 | Vorech | Nov. 22, 1938 |
| 2,200,013 | Sanford | May 7, 1940 |
| 2,252,009 | Kenny | Aug. 12, 1941 |
| 2,263,047 | Newton | Nov. 18, 1941 |
| 2,291,690 | Caves | Aug. 4, 1942 |
| 2,296,646 | Matulaitis | Sept. 22, 1942 |
| 2,322,479 | Schjolin | June 22, 1943 |
| 2,341,756 | Avila | Feb. 15, 1944 |
| 2,348,435 | Hey et al. | May 9, 1944 |
| 2,380,677 | Schjolin | July 31, 1945 |
| 2,397,883 | Peterson | Apr. 2, 1946 |
| 2,434,717 | Randol | Jan. 20, 1948 |